United States Patent [19]
Williams et al.

[11] Patent Number: 5,630,164
[45] Date of Patent: May 13, 1997

[54] SCIENTIFIC INSTRUMENT EMULATOR HAVING A COMPUTER AND AN ANALOG SIGNAL INTERFACE FOR REAL-TIME SIGNAL PROCESSING

[75] Inventors: Donald V. Williams, Balmain; John B. Keeble, Neutral Bay; John D. Oates, Quakers Hill; Alejandro G. Campos, North Rocks, all of Australia

[73] Assignee: Associative Measurements Pty. Ltd., Australia

[21] Appl. No.: 627,908

[22] Filed: Mar. 29, 1996

Related U.S. Application Data

[63] Continuation of Ser. No. 343,368, Nov. 22, 1994, abandoned, and Ser. No. 843,889, Feb. 27, 1992, abandoned.

[51] Int. Cl.$^6$ ............................................. G06F 15/00
[52] U.S. Cl. .................. 395/800; 395/500; 395/140; 395/920; 364/578
[58] Field of Search ........................ 395/800, 500, 395/140, 920; 364/578

[56] References Cited

U.S. PATENT DOCUMENTS

| | | | |
|---|---|---|---|
| 4,064,394 | 12/1977 | Allen | 364/189 |
| 4,315,315 | 2/1982 | Kossiakoff | 395/140 |
| 4,507,740 | 3/1985 | Star et al. | 364/487 |
| 4,677,587 | 6/1987 | Zemany | 395/500 |
| 4,807,161 | 2/1989 | Comfort et al. | 364/550 |
| 4,866,663 | 9/1989 | Griffin | 395/500 |
| 4,868,785 | 9/1989 | Jordan et al. | 395/140 |
| 4,901,221 | 2/1990 | Kodosky et al. | 395/159 |
| 4,914,568 | 4/1990 | Kodosky et al. | 395/159 |
| 5,155,836 | 10/1992 | Jordan et al. | 395/500 |
| 5,301,301 | 4/1994 | Kodosky et al. | 395/500 |
| 5,301,336 | 4/1994 | Kodosky et al. | 395/800 |
| 5,329,470 | 7/1994 | Sample et al. | 364/578 |
| 5,329,471 | 7/1994 | Swoboda et al. | 364/578 |

OTHER PUBLICATIONS

Caven et al., "An Icon–Based . . . Development," IEEE Trans., on Industrial Electronics, vol. 37, No. 3, Jun. 1990, pp. 259–264.

Santori, "An Instrument that isn't really," IEEE, 1990, pp. 36–39.

Wight et al., "Design and Implementation . . . Diagnostics," IEEE, 1989, pp. 687–690.

Kodosky et al., "Visual Programming . . . Data Flow," IEEE, 1991, pp. 34–39.

Das et al., "On the Use of . . . Simulation," IEEE, 1991, pp. 158–162.

Richard V. Witeley et al., "An Inexpensive, Versatile Experiment for Teaching Computer-aided Experimentation," American Journal of Physics, vol. 57, No. 7, Jul. 1989, pp. 741–746.

Herb Treat, "Using Mathematica in Support of LabView: Power in the Laboratory," Northetn Conf. Record, Oct. 9, 1990, pp. 353–358.

"Lab View Version 2.0," PC Business Software, vol. 14, No. 1, 1989, pp. 2–3.

*Primary Examiner*—Alyssa H. Bowler
*Assistant Examiner*—John Follansbee
*Attorney, Agent, or Firm*—Pravel, Hewitt, Kimball & Krieger

[57] ABSTRACT

A scientific instrument emulator is disclosed and comprises a computer (1) including a memory (3) and at least two processors (2,9). An analogue I/O module (6) is configured within the computer (1) and connects via a bus (11) thereby permitting conversion of analogue signals into digital signals for processing by the processors (9). The module (6) permits connection to monitoring and/or sampling devices such as transducers which permit analysis and recording of physical phenomena. The emulator is programmable via a library of processing functions stored in the memory (3) to adapt the processors (9) to emulate the operation of a plurality of scientific instruments thereby permitting display of monitored events on a VDU (10) in real-time and/or storage of data relating to the events in the memory (3). Data can also be recorded in analogue format using one or more tape recoders connectable to the module (6).

17 Claims, 15 Drawing Sheets

SCIENTIFIC INSTRUMENT EMULATOR HAVING A COMPUTER AND AN ANALOG SIGNAL INTERFACE FOR REAL-TIME SIGNAL PROCESSING

This is a continuation of application Ser. No. 07/843,889, filed on Feb. 27, 1992 now abandoned and continuation Ser. No. 08/343,368, filed on Nov. 22, 1994, now abandoned.

Appendices I to IV of this patent document contain material which is subject to copyright protection. The copyright owner has no objection to the facsimile reproduction by anyone of the patent disclosure, as it appears in the Patent and Trademark Williams Rule 60 Continuation of U.S. Ser. No. 07/843,889 Office patent files or records, but otherwise reserves all rights whatsoever.

FIELD OF THE INVENTION

The present invention relates to scientific instruments and, in particular, to an emulator which enables the function of various scientific instruments, when interconnected, to be emulated or replicated without the need to purchase, install, interconnect, and test, the various scientific instruments. In its preferred form, the present invention enables measurements to be taken, and the use of measurement processes, which were unable to be taken, and used, with the interconnected instruments.

BACKGROUND ART

In many fields of activity having a scientific basis, scientific instruments are used to analyse, record, and monitor the outputs of various devices. Such devices include strain gauges, electro-cardiograph (ECG) devices, microphones, and pressure, temperature, flow rate and like transducers. Accordingly, such scientific instruments are used in civil engineering, electrical engineering, acoustics, hydraulic engineering, chemical processes, bio-medical engineering and so on.

A wide range of such scientific instruments are generally required in order to undertake desired measurements. Such instruments include generators for various wave-forms (such as sine, square, ramp, and triangle); signal processing devices such as differentiators, integrators, filters, multipliers, and so on; analysers such as that required to carry out the Fast Fourier Transform, and various recording devices such as a chart recorder, a data logger, a cathode ray oscilloscope or a transient recorder.

Such instruments or devices are each relatively expensive and thus any research institution, or like organisation only has a limited number of such devices. Accordingly, there is considerable competition amongst persons or groups within such organisations who wish to utilise the devices. Once the devices have been obtained in order to carry out the intended operation, it is necessary for the devices to be located together, interconnected, and tested in order to ensure that the interconnections are correct. Only once this procedure has been carried out is it then possible to commence the intended operation.

It is known in the art to provide instruments which are essentially highly advanced cathode ray oscilloscopes. One such instrument is sold under the name SUPERSCOPE by G W Instruments of Summerville, Mass. U.S.A. 02143 and enables waveforms captured by what is essentially a storage oscilloscope to also be displayed on an APPLE (Registered Trade Mark) Macintosh (Registered Trade Mark) Computer. However, this device does not appear to emulate instruments, rather it only captures and stores for subsequent display the output of such instruments.

It is also known to utilise software for data acquisition. One such program offered by LABTECH of Willmington, Mass. and San Francisco, Calif., U.S.A. is a graphical interface which again accepts signals from various hardware items external to the computer. The software collects data from multiple channels, carries out an analysis and, if necessary a reduction of the data and produces displays. This activity is available in real-time. Again, no attempt is made to emulate the function of scientific instruments. A further difference is that the graphical interface connects to a number of different machines, rather than being essentially integrated into one unit.

A data acquisition and analysis system sold under the trade name LABVIEW2 by National Instruments of Austin, Tex., U.S.A. is also known. In this system, icons are used to represent both data acquisition functions and data analysis functions. These icons are used to generate executable code which is only executed by the personal computer into which the software of the system is loaded. This system uses no hardware, only software. The data acquisition and analysis functions can be sequentially linked so that data input into the computer can be first acquired and then analysed. Finally the analysed data is presented. It is to be noted that the computer functions to make desired inter-connections between external instruments but does not emulate instruments or compile a program to replicate the signal processing functions of an array of inter-connected instruments. For example, no provision for feedback from one icon back to another in the control sense, is made. The slow processing speeds, and the indetermine nature of the multi-tasking environment of the APPLE (Registered Trade Mark) personal computer, require the provision of a time "co-ordinate" to accompany the acquired data.

This system is a virtual instrument which is to say it is characterised by software simulation only and is to be contrasted with the new concept of emulation. Emulation involves flexible, multipurpose, re-programmable hardware which executes code derived from a graphic compilier at a fast operating speed which enables real time instrument emulation.

SUMMARY OF THE INVENTION

It is the object of the present invention to reduce the expense and inconvenience associated with scientific measurements by the creation of an entirely new instrument termed a Scientific Instrument Emulator. The task of the emulator is to reproduce by means of a combination of both hardware and software, the functions of various scientific instruments thereby enabling not only the individual functions of the instruments to be replicated, but for such replicated functions to be interconnected with each other so that the emulator as a whole can replicate the overall function of an array formed by interconnected scientific instruments.

A number of very substantial advantages are attained thereby. Firstly, the overall cost of the apparatus is substantially reduced since the individual scientific instruments the functions of which are to be replicated, need not be purchased. Secondly, a substantial saving in set up time is also achieved since it is not necessary for such instruments to be bought from various locations and assembled at the one point and physically interconnected with wiring, plugs, adaptors, and so on. Thirdly, the results achieved are much improved in that the output of the array of interconnected scientific instruments is not only able to be displayed in real time, but it is, in addition, processed in real time and is also able to be stored for subsequent manipulation, analysis and evaluation. Finally, the results of simultaneous or parallel measurements can be more easily associated so that the interrelationships between measurements can be ascertained, particularly in complex systems.

According to a first aspect of the present invention there is disclosed a scientific instrument emulator comprising computer means including memory means and processor means, an input/output analogue signal module having at least one analogue signal input with digitising means connected thereto and at least one output, a video display screen and a video display generator connected therewith, a library program stored in said memory and including a plurality of instrumentation units each able to be displayed on said screen and each having a predetermined signal processing function, a set-up program stored in said memory and usable by the operator to interconnect said instrumentation units to form an array of interconnected instrumentation units, the output of said array being connected to at least one of said video display generator, said analogue signal module and said memory means, and a compiler program stored in said memory and executable by said processor means on completion of said set-up program to create a program to carry out the overall signal processing function determined both by the nature of said selected instrumentation units and the nature of said array, whereby following operation of said compiler program, an input signal applied to said input analogue signal module is processed by said processor means in accordance with said overall signal processing function of said array and the output is generated in real time and displayed on said video display screen in real time, and/or stored in said memory means, and/or output by said analogue signal module in real time.

Preferably the instrumentation units are each represented by a corresponding icon which is able to be displayed on the video display screen during the operation of the set-up program to enable the operator to select, and locate in the array, the desired instrumentation unit.

The compiler generates in the memory a number of different programs representing the array of instrumentation units. These programs are distributed to the processor in the computer system to emulate the desired array of instrumentation units. Preferably, the compiler generated programs are stored in memory to create preconfigured instrumentation arrays instantly capable of executing desired processing functions. These programs store the accumulated intellectual product of the user.

Preferably the number of processors, video generators and analog signal modules is expandable to obtain the desired degree of complexity and/or capability of the array of instrumentation units.

The analogue signal module has available a real time electric signal which can be used to operate, or trigger, other items of hardware. Preferably it also provides both analogue and digital output.

The input/output from the scientific instrument emulator is preferably also available from other resources available within the computer including network communications interfaces (RS232, ETHERNET etc) and bus interfaces such as IEEE-488-GPIB, ISA and EISA. These resources can be provided independently by the purchaser or original equipment manufacturers (OEM's).

The data stored in the memory means is also preferably available for data "export" to various standard computer packages such as those sold under the trade marks EXCEL, LOTUS and AXUM whereby the data accumulated can be manipulated for subsequent graphical presentation and tabulation to facilitate report generation.

According to a second aspect of the present invention there is disclosed a scientific instrument for measuring and recording electrical waveforms, said instrument comprising a computer having a central processing unit and electronic memory means positioned within a housing, said housing including provision for at least one floppy disc nacelle; and a plurality of electrical connectors accommodated in the space allocated for said one floppy disc nacelle, said electrical connectors being connected to said memory means.

According to a third aspect of the present invention there is disclosed a compilation method for generating object code to implement the mathematical/signal processing function of an electrical circuit functional block having at least one input to form an output thereof, said method comprising the steps of representing said function as a sequence of elemental mathematical steps each of which is itself directly representable in said object code, and arranging the object code steps in said sequence for sequential execution commencing with said input(s). Preferably a parameter of said functional block is able to be specified. Also disclosed is a compilation method for generating object code to implement the mathematical/signal processing function of an electrical circuit having at least one input and at least one output and formed by interconnection of a plurality of functional blocks each of which has a mathematical/signal processing function for which an object code has been compiled in accordance with the above, said method comprising the steps of representing the electrical circuit mathematical/signal processing function as a sequence of events each of which is representable in said object code, and arranging said object code events in said sequence for sequential execution commencing with said input(s).

DESCRIPTION OF THE DRAWINGS

An embodiment of the present invention will now be described with reference to the drawings in which.

Appendices I–IV list various program fragments described hereafter.

DESCRIPTION OF THE PREFERRED EMBODIMENT

Figure 1:
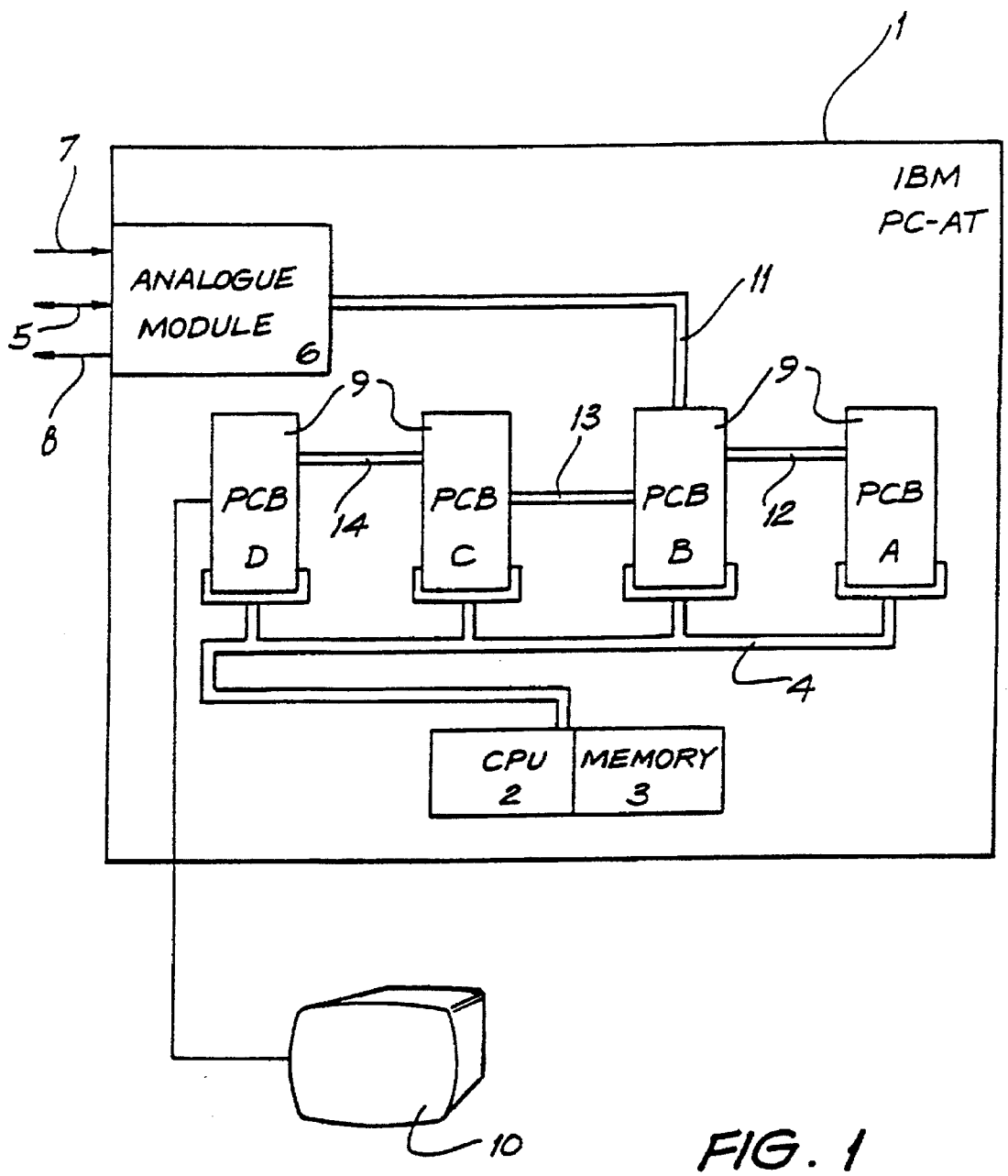
FIG. 1 is a schematic block diagram of the hardware modifications required to an IBM PC.

Turning now to FIG. 1, the apparatus of the preferred embodiment is able to be totally enclosed within the case 1 of a conventional IBM (Registered Trade Mark) Personal Computer having an ISA or EISA bus based on the original IBM AT. Located within the case 1 are the usual components of a central processing unit (CPU) 2, memory 3 and 8 MHz bus 4.

Located within a spare 5¼ inch floppy disc nacelle is an analogue module 6 onto which are mounted dedicated input plugs 7, dedicated output plugs 8, and general input/output lines 5 for amplifiers, frequency counters, sample clock synchronising, digital inputs and the like.

Located on the bus 4 are four slots for printed circuit boards 9. The four PC boards 9 are indicated A, B, C and D respectively. The three adjacent PCB's A to C inclusive are respectively a master PCB, a slave PCB and a video PCB. The video PCB in turn drives a known VGA printed circuit board D sold by Tseng Labs which can provide 800×600 resolution in 256 colours. This PC board D is directly connected to the video display screen 10.

Within the analogue module 6 are located the following system resources:

1 FOUR isolated (optional) analog i/p channels. Each channel has programmable 9–120 dB gain (3 micro volts resolution @ signal to noise ratio of one), programmable anti-alias filtering and an ADC conversion of 12 bit resolution. Each channel can be AC or DC coupled with long AC coupling time constants (2 minutes) and has independent controls of AC or DC offsets which can be controlled from the runtime screens. The sampling rate can be 15 KHz per channel (depending on the project processing load) and the number of analog modules attached to the same slave processor card. The inputs are isolated to 3.5 KV continuous.

2 TWO analog outputs with a voltage range of ±10 Volts and a current capacity of ±100 mA. These can be used for strain gauge biasing (AC or DC driven), control outputs etc.

3 FOUR selectable high level analogue outputs, one from each of the amplifiers above. These drive digital FM tape recorders to store rarely occurring events for replay into the processor (2).

OR

FOUR selectable high level inputs to each of the amplifier channels above. The system is switched into this mode for replay of events captured in output mode on tape.

4 EIGHT bits of ground referenced digital input.

5 EIGHT bits of digital output which can be used for relay drivers or event indicators.

6 ONE frequency generator output (clock generator) 0–2 MHz 0.1% accuracy.

7 ONE event counter/frequency counter. Input 0.1 Hz–8 MHz.

8 ONE 5 Volt reference 100 mA ±5%. (For strain gauges etc.)

9 ONE sample clock output reference line for synchronising sampling between multiple scientific instrument emulators of the preferred embodiment.

10 ONE sample clock input reference line for synchronising sampling from a "master" scientific instrument emulator (for use with "slave" emulators), and 11 FIVE ground wires.

The analogue module 6 and PC boards 9 are each interconnected by means of different subsidiary buses 11, 12, 13 and 14 respectively.

Figure 2:
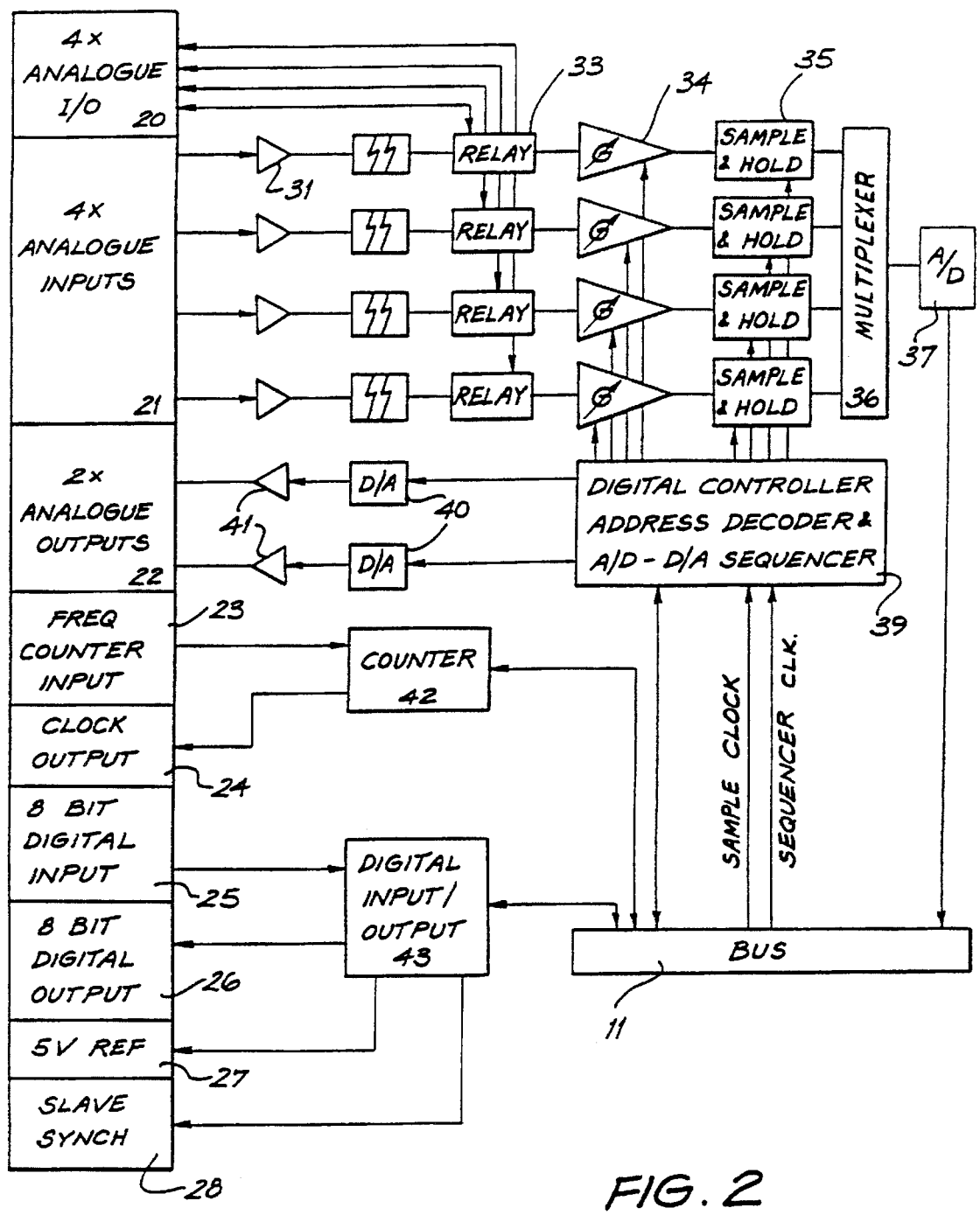
FIG. 2 is a block diagram of the analogue module of FIG. 1.

As seen in FIG. 2, the analogue module 6 of FIG. 1 is provided with four analogue input/output connectors 20, four analogue inputs 21, two analogue outputs 22, a frequency output counter input 23, a clock output 24, an 8 bit digital input 25, an 8 bit digital output 26, a five volt reference voltage 27 and a slave synchronizing output 28.

Each of the analogue inputs 21 is connected via a front end amplifier 31 to an isolator 32, the output of which is connected to a relay 33. The relay 33 is also connected to the analogue input/output connectors 20 and to an amplifier 34 which has programmable gain, AC/DC coupling, provision for an AC corner and DC offset. The output of the amplifier 34 is in turn passed to a sample and hold circuit 35 the output of which is received by an analogue multiplexer 36. The output of the multiplexer 36 is passed via an A/D converter 37 to the subsidiary bus 11 which connects the analogue modules 6 and the PC board 9B.

The operation of the amplifiers 34 and the sample and hold circuits 35 is controlled by a digital controller, address decoder and A/D-D/A sequencer 39 which receives both data from the bus 11 and also sample clock and sequencer clock signals. The controller/decoder/sequencer 39 also outputs via D/A converters 40 to the analogue outputs 22 via an output amplifier 41.

The frequency counter input 23 and clock output 24 respectively directly communicate with a counter 42 which again communicates directly with the subsidiary bus 11.

Each of the digital inputs 25, digital outputs 26, reference voltage 27 and slave synchronizing output 28 is connected to a digital input/output circuit 43 which is in turn directly connected to the subsidiary bus 11.

Figure 4:
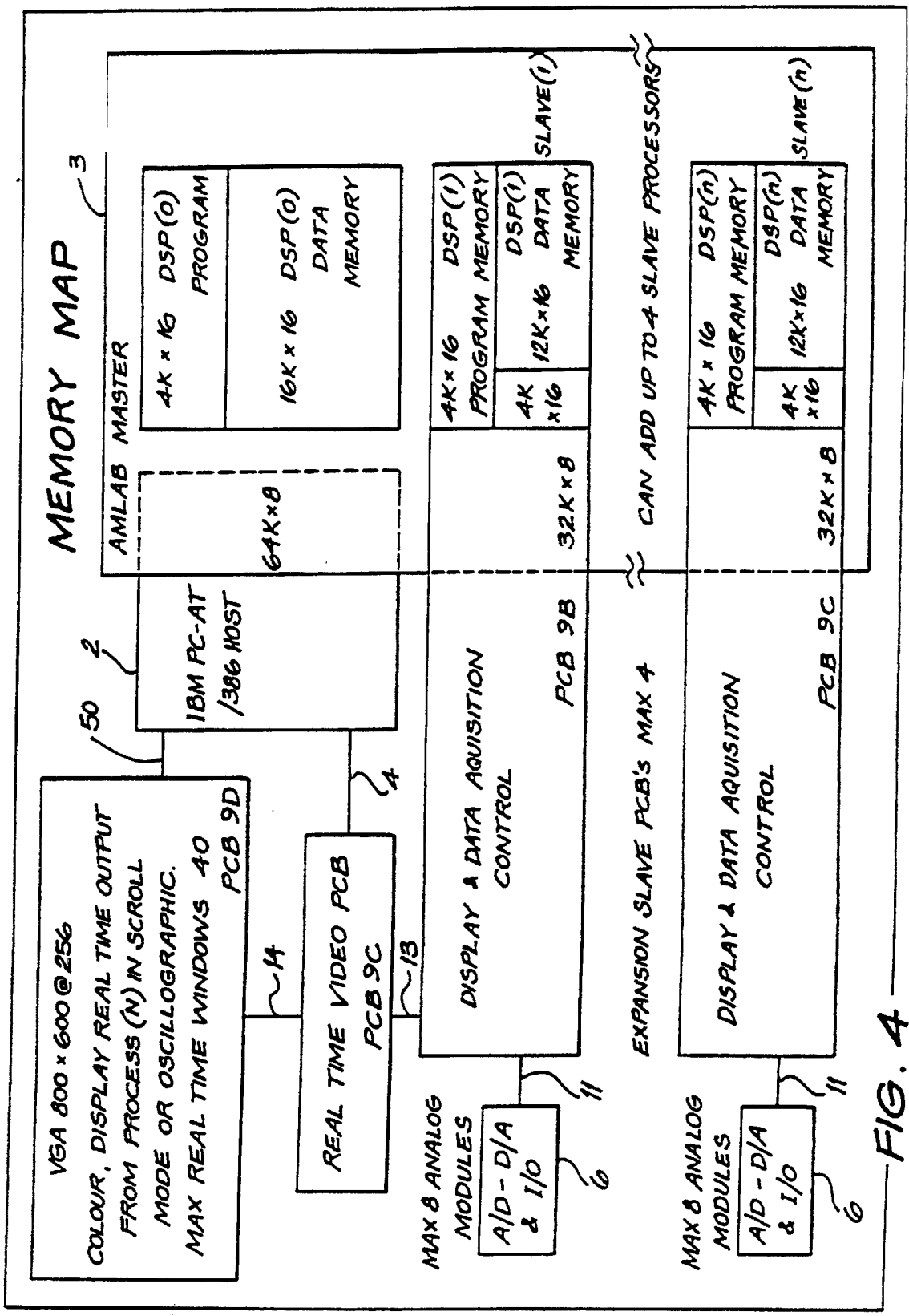
FIG. 4 is a schematic map of the memory arrangement within the computer.

The timing arrangements of the circuit illustrated in FIG. 2 are divided into two sequences. The first sequence concerns the digital input and output. When required by the program, this digital input and output is effected by individual commands from a substantially conventional data acquisition controller which forms part of the slave processor on PCB 9B (FIG. 1 and FIG. 4).

The second sequence is the flow of digital data converted from the analogue inputs, or to be converted to provide the analog outputs. This digital data is received and despatched under the control of the controller/decoder/sequencer 39 which can be preset to operate the required number of incoming and outgoing analogue channels. The controller/decoder/sequencer 39 performs one complete cycle of inputting and outputting, or sequence, every sample period and does so with minimal processor involvement, thus increasing the speed of operation of the data acquisition controller referred to above on the slave processor of PCB 9B.

Other functions of the circuit of FIG. 2, such as the frequency to be output as the clock output 24, the "range" of the frequency to be counted by the frequency counter input 23, and any synchronisation signal required for the slave synchronising signal 28, are set up at the start of the execution of the graphical compiler program by appropriately specifying the corresponding icon.

Figure 3:
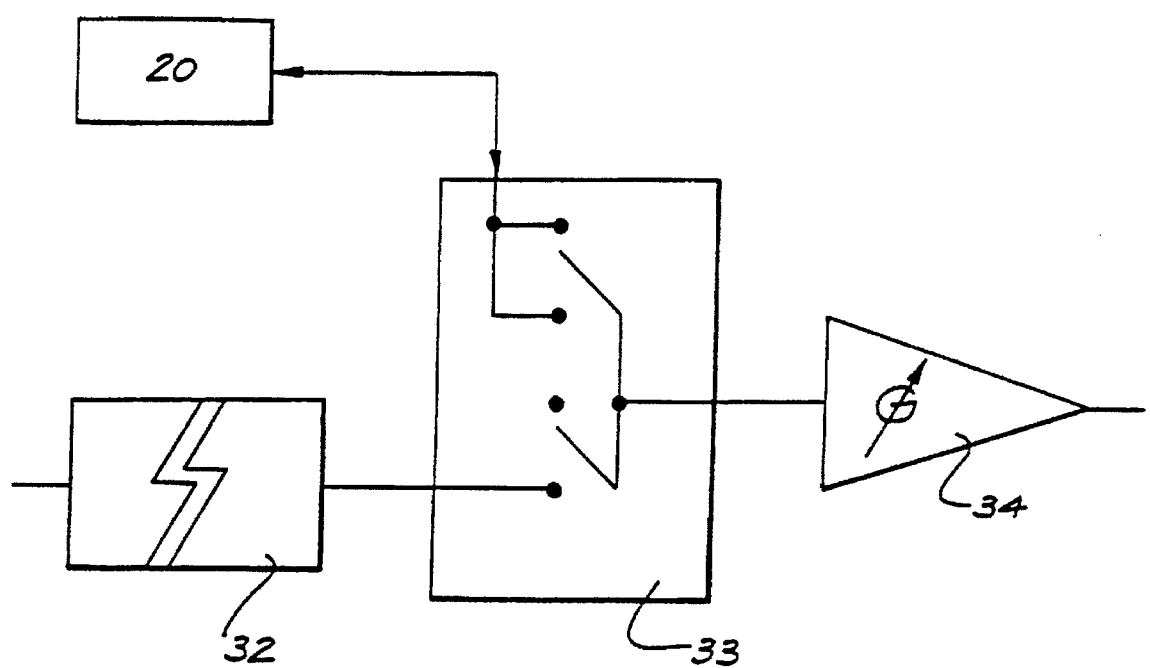
FIG. 3 is a circuit diagram of one of the identical relays of FIG. 2.

FIG. 3 illustrates in detail the nature of the relay 33 which can be switched between two positions. In the position shown, the input from the analogue input/output 20 is passed to the amplifier 34, thereby isolating the analogue inputs 21. In the alternative position, the input from the analogue inputs 21 is passed to the amplifier 34 but is also made available as an output at the analogue input/output 20.

FIG. 4 is a pictorial representation of the processor architecture and includes a memory map. The host computer 2 with its associated memory 3 is connected to the video PCB 9C which is in turn connected to the slave PCB 9B.

As indicated in FIG. 4, up to 8 analogue modules 6 are able to be connected to each PCB 9B and up to four slave PCB's 9B can be added.

The memory map is essentially three dimensional with the memory 3 of the host computer 2 overlying, and thereby being accessible to, the other memory utilizing portions of the circuit.

Figure 5:
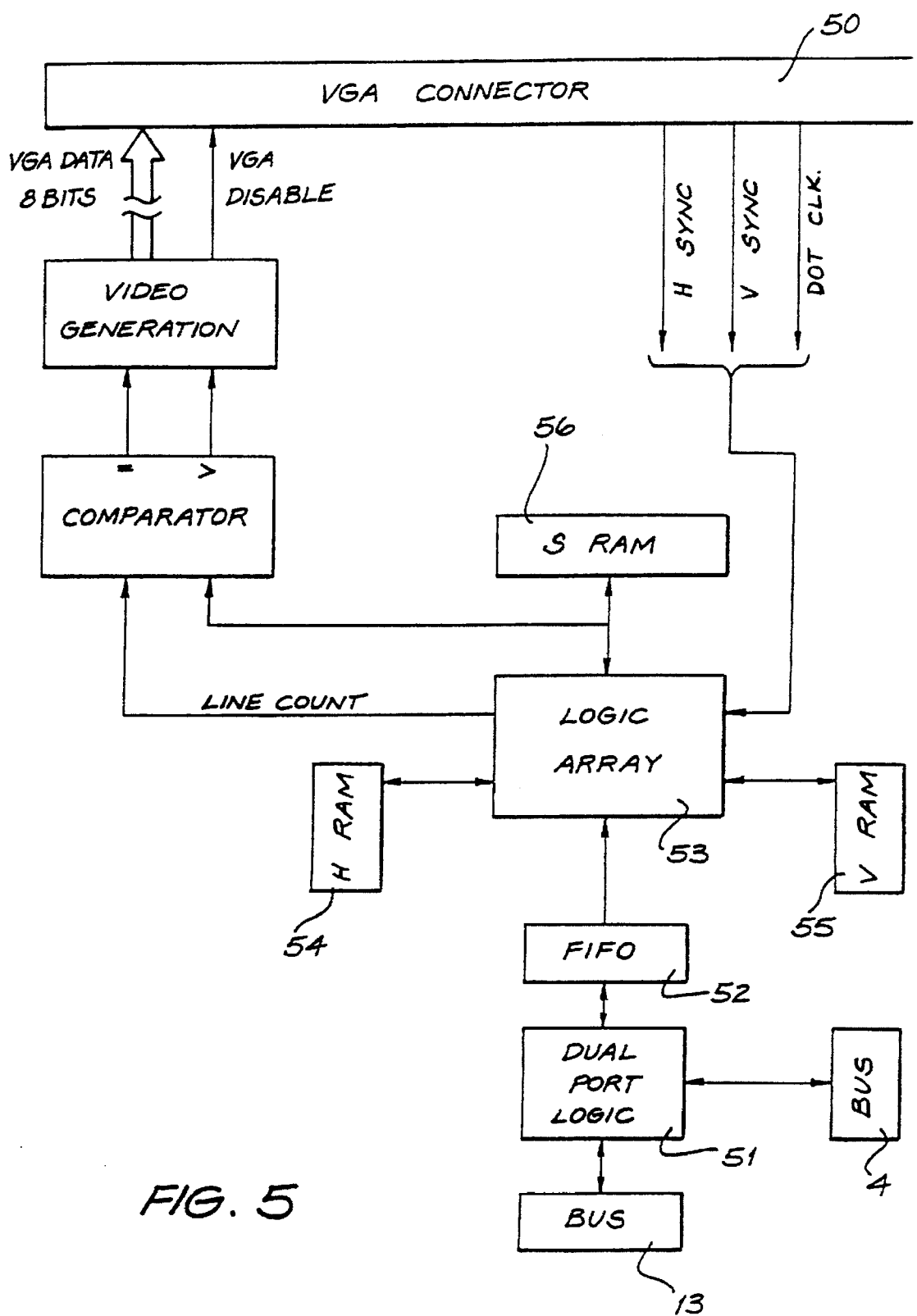
FIG. 5 is a block diagram of the real time video printed circuit board of FIG. 4.

A block diagram of the video PCB 9C is illustrated in FIG. 5. In this diagram the interconnections between the conventional video graphics adaptor (VGA) of the host computer are made via the conventional VGA connector 50. The connections between the host computer 2 and the video PCB 9C are via bus 4. Similarly the connections between the video PCB 9C and each of the slave PCB's 9B is via bus 13 as previously indicated in FIG. 1.

Data received from either bus 4 and/or 13 is passed via a dual port logic circuit 51 to a first in first out (FIFO) buffer 52. The FIFO 52 outputs to a logic array circuit 53 which has three separate random access memories, horizontal RAM 54, vertical RAM 55 and a static RAM 56.

The output of the logic array 53 is passed via comparator 57 to a video generator 58 and thence to the VGA connector 50. In addition, the logic array 53 also receives three signals from the VGA connector in the form of horizontal synchronizing pulses, vertical synchronizing pulses and a dot clock.

Essentially the logic array 53 takes the data supplied via buses 4 and/or 13 and calculates pixels to replace the individual pixels generated by the video graphics adaptor (VGA) 12 and complies with multimedia standards for communication of the video image on bus 14.

Figure 6:
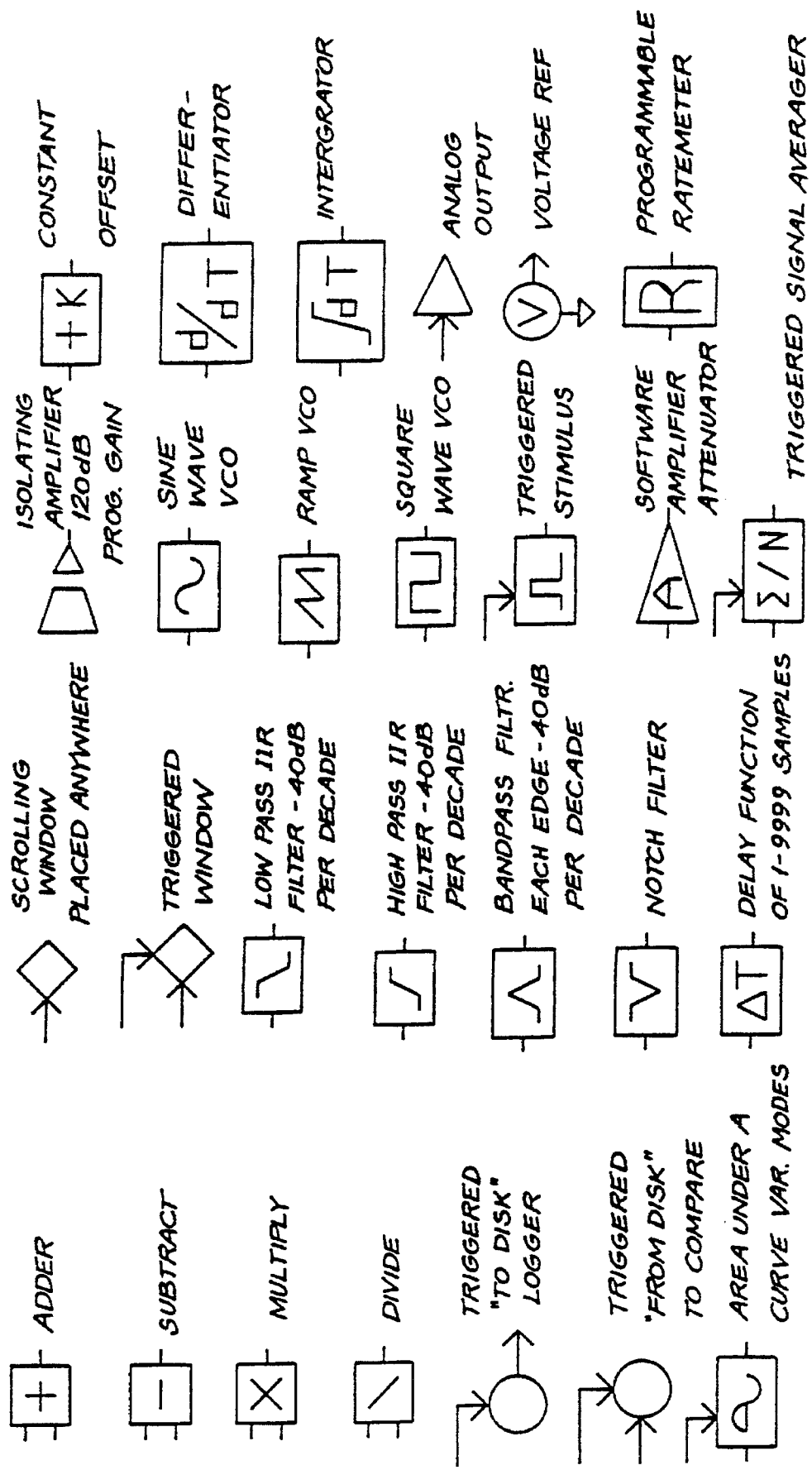
FIG. 6 is a screen display listing the icons representing the various instrumentation units stored within the library program.
Figure 7:
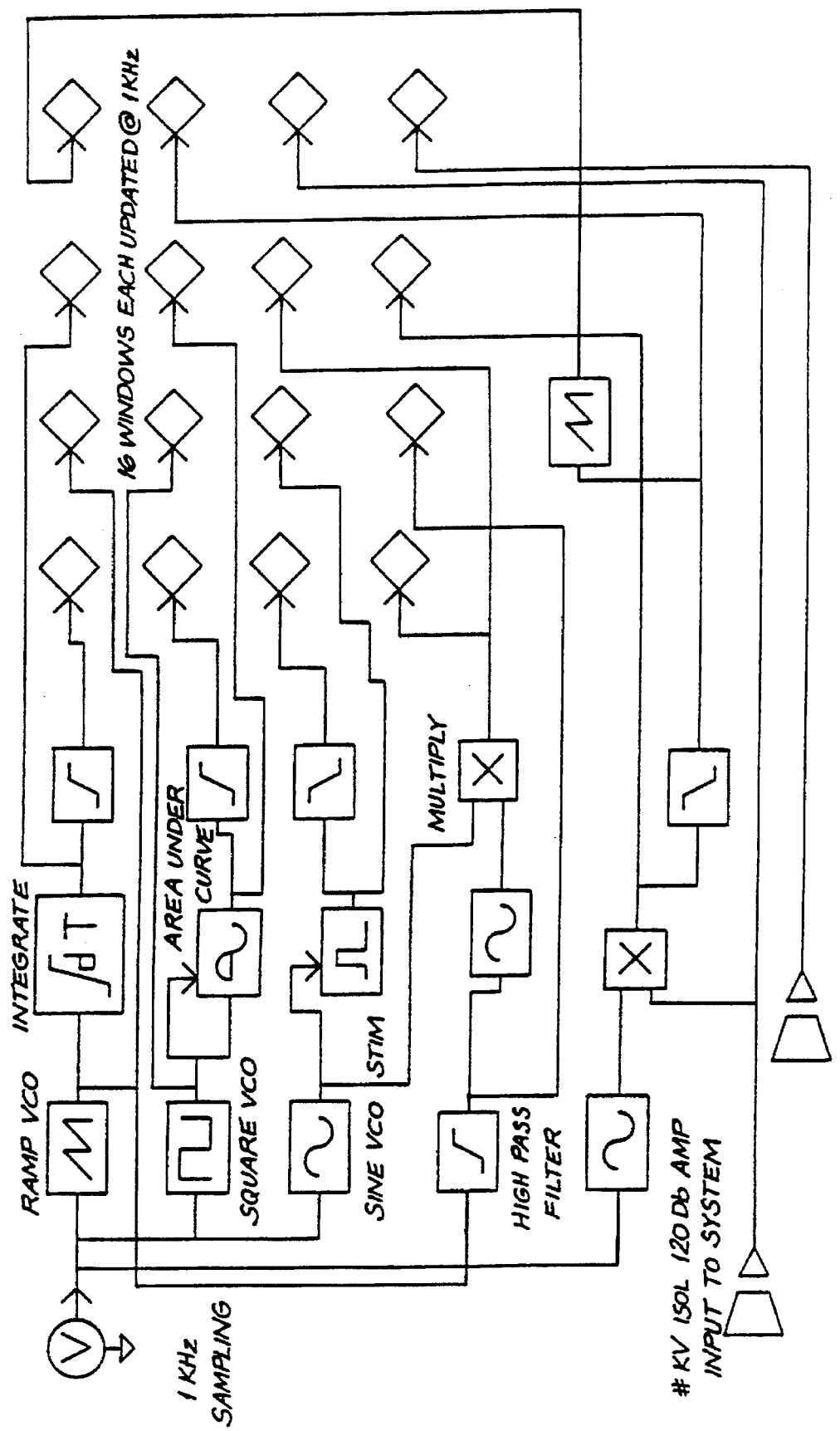
FIG. 7 is a typical array formed by inter-connection of the various instrumentation units.

The memory 3 (FIGS. 1 and 4) has a library of instrumentation units. Each of these is represented by an icon and FIG. 6 provides an indication of the range of instrumentation units able to be selected from a given library. By use of a mouse In Known fashion, the operator is able to interconnect selected instrumentation units from the icon list of FIG. 6 so as to form an array of interconnected instrumentation units as illustrated in FIG. 7. During the course of the creation of the array of FIG. 7, under software control the machine checks that the array does not have any unconnected inputs, logically unacceptable connections, and like defects. Any detected defect is indicated.

Once the array has been interconnected to the satisfaction both of the operator and the set-up program used during this phase, a compiler program is then run which compiles from the graphical representation of the array the executable object code which executes the overall signal processing function for the entire array. As a consequence, when, in real time, the input signal is applied to the array, the incoming signal(s) is/are manipulated and the one or more outputs of the array are indicated in real time on the video windows able to be displayed on the screen 10, stored to disc, and so on.

Essential to an understanding of the way in which the compiler program operates is an appreciation that each icon is itself a mini array which can be built up from very fundamental steps which are themselves easily executed by the program. For example, If the basic steps are taken to be addition and subtraction, then multiplication can be regarded as repeated addition, and division can be regarded as repeated subtraction. With this background in mind, it can be appreciated that a ramp voltage generator can be created from a zero initial level by the successive additions of very small increments until a predetermined level is reached. Then that level is itself subtracted so as to re-create the zero starting point. Then the small additions are again made, and so on.

A consideration of the various icons represented in FIG. 3 will also lead to the appreciation that the icon is itself essentially a graphical form of any desired shape designed to convey a representation of a specific mathematical or signal processing function which is both seen by the user and Identically understood by the graphical compiler program. The shape contains at least one input node and/or at least one output node these being respectively the entry and exit points for data streams. For example, an adder having input nodes A and B and output node C is compiled to give the program C=A+B. Those icon elements having only one or more output nodes are termed source icon elements (e.g. a voltage generator) whilst those icons having only one or more input nodes are termed a destination icon (e.g. a display window).

Interconnecting any output node and terminating at an input node a connecting path termed a data stream. The data stream carries the data type associated with the output node and, as a consequence, the input node at which terminates must be of the same data type. This provides an additional rule inherent within the compiler program. Since the interconnections between nodes represent data streams, rather than physical wiring, it is permissable for the interconnections between icons to cross over other interconnections or even other icons without ill effect. This is because the data stream has an output node and an input node and is unconcerned with any intermediate location. The co-ordinates of the source and destination nodes on an arbitary co-ordinate system are used to create the software "pointers" to source and destination data buffers for the execution of the signal processing functions on the data "pointed" to.

Also included with an icon is an icon specification where the icon itself is insufficient to describe the entire function of the icon. For example, an amplifier has a function, output= G×input, where G is the gain of the amplifier. However, in order to enable the gain to be specified by the user, the gain is able to be input as a predetermined parameter by means of the icon specification.

It will be seen that using the above methodology, a library of prepared icons each with its own program to carry out the mathematical/signal processing function of the icon can be prepared. Furthermore, the same methodology is again applied once it is desired compile a program to carry out the mathematical/signal processing functions of an array formed from inter-connected icons. To take a simple example of an array, consider an array having two inputs A and B and an output C, the array consisting of an adder having inputs A and B, the output of the adder being connected to an amplifier having a gain G with the output of the amplifier constituting the output of the array. The mathematical/signal processing function is C=G×(A+B). The graphic compiler of the preferred embodiment creates machine code in the same way as would a FORTRAN compiler when it was presented with substantially the same statement but present in source code written in the FORTRAN language.

Appendix I constitutes a program fragment of code which permits the user to decide what the icon specification will be for the given icon. The "pop-up" window portion of the display into which the user inputs the numerical value(s) to be specified is termed a "sheet".

Similarly the program fragment of Appendix II is an example of the programming used in compiling an icon. The code used in compiling an array is analogous.

Appendix III is a code fragment which is an example of the digital signal processing (DSP) implementation code. This code enables digital signals which replicate the output of actual electronic devices (as represented by an icon or array) to be created.

Finally, Appendix IV is a code fragment of the timing or sequencing used in the digital signal processing. This ensures the timely completion of the calculations in the time between successive samples.

The operation in "real time" is assisted by the way in which analogue input signals are acquired. The permissable ±10 V input range is represented by a 12 bit number and the analogue input signal is sampled at a sampling frequency of from 1 to 60,000 points or samples per second. The exact sampling frequency is specified or selectable by the user. As a consequence of this sampling regime, all the programming steps required to emulate the particular function of an icon or an array are required to be completed, and thus create an output, in the time available between sampling points. In this way, the output for a given sampling point is calculated and hence created, prior to the receipt of the information for the next sampling point. This procedure enables real time operation with the proviso that if the calculation time exceeds the sampling period then either additional computer resources in the form of extra processor and/or memory must be provided to reduce the calculation time, or the sampling frequency must be reduced, thereby increasing the time for calculation. The increasing processing power of modern computers means that, in practice, any limitation to the sampling frequency is not of practical concern.

It will also be appreciated in connection with the above that the calculation to be performed by the computer can include feedback of an output at one sample time which then constitutes an the input for a subsequent calculation at the next sample time. The subsequent calculation must, however, be completed within the sampling period.

Figure 8:
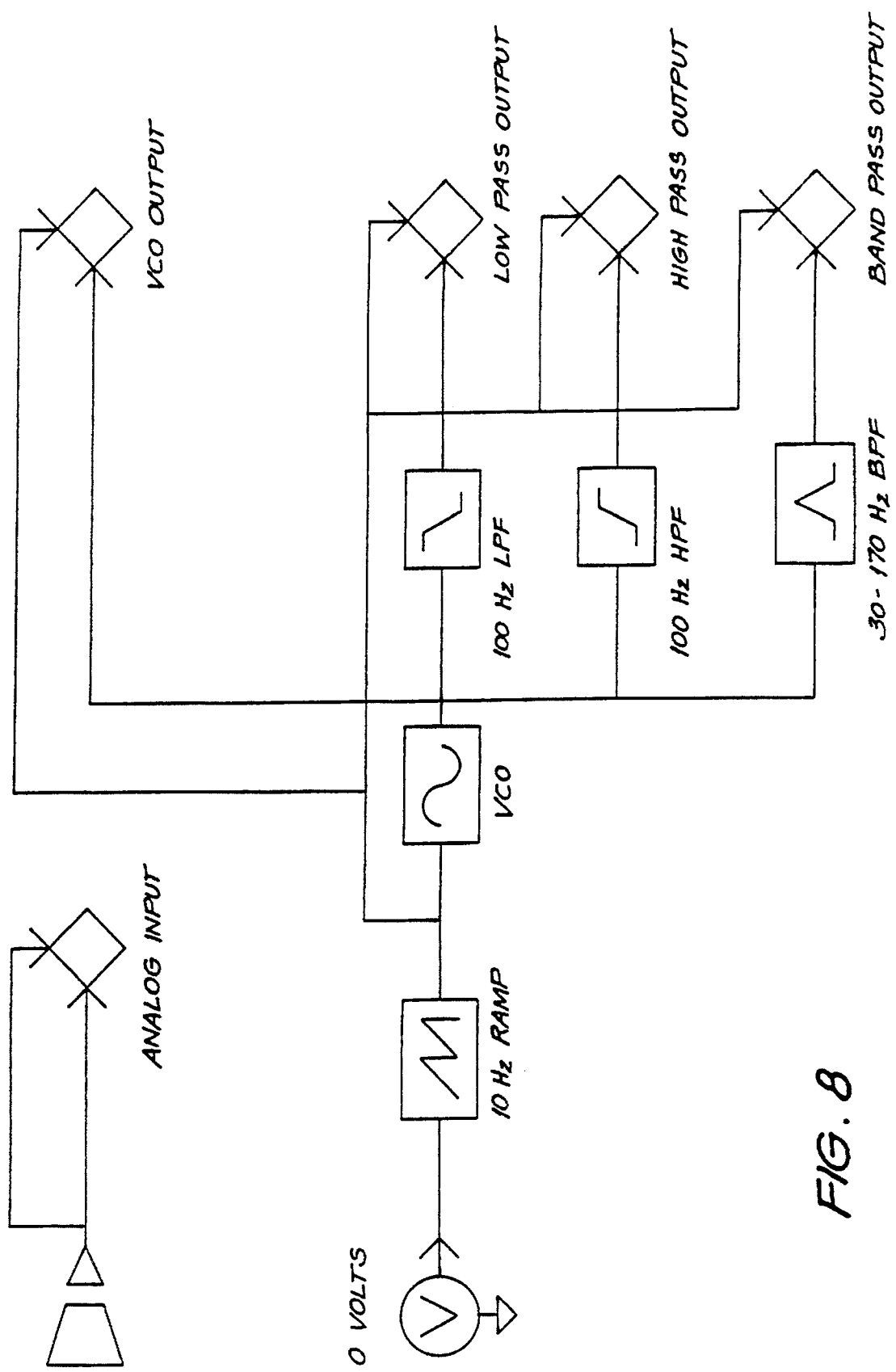
FIG. 8 is a block diagram of a relatively straight forward array useful in bio-medical applications.
Figure 9:
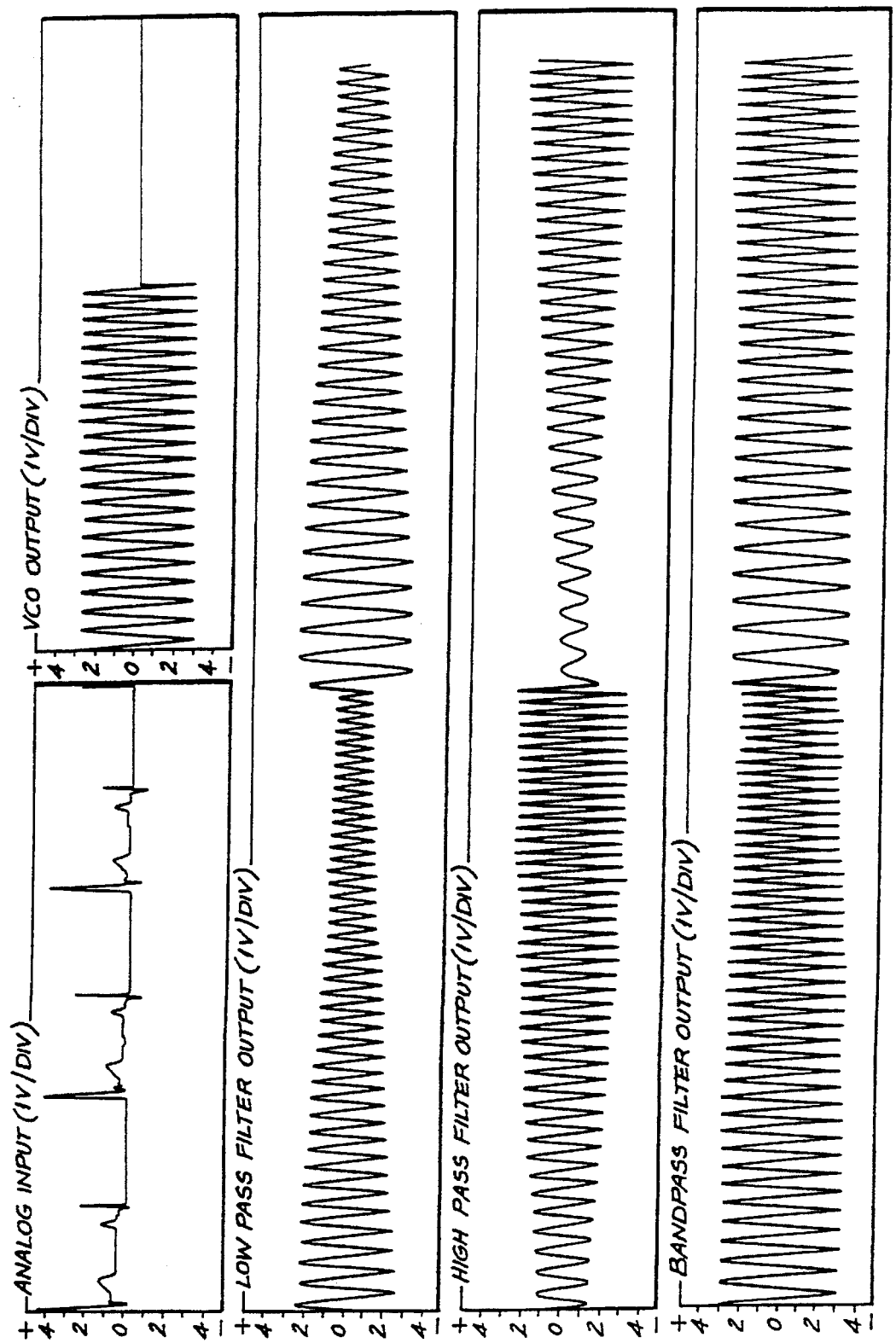
FIG. 9 is a reproduction of the screen display windows corresponding to the array of FIG. 8.

FIG. 8 illustrates two relatively simple arrays. The input and output waveforms to, and from, those arrays are respectively illustrated in FIG. 9. it will be seen that the input and output of the first array comprises an analogue voltage from an ECG. For the other array, the four outputs comprise the output of the voltage controlled oscillator, and that output when respectively passed through a low pass filter, a high pass filter and a band pass filter. Note that since the arrays are not in any way related, although all the waveforms can be simultaneously generated and/or displayed, it is not necessary for the results to be linked in any way.

Figure 10:
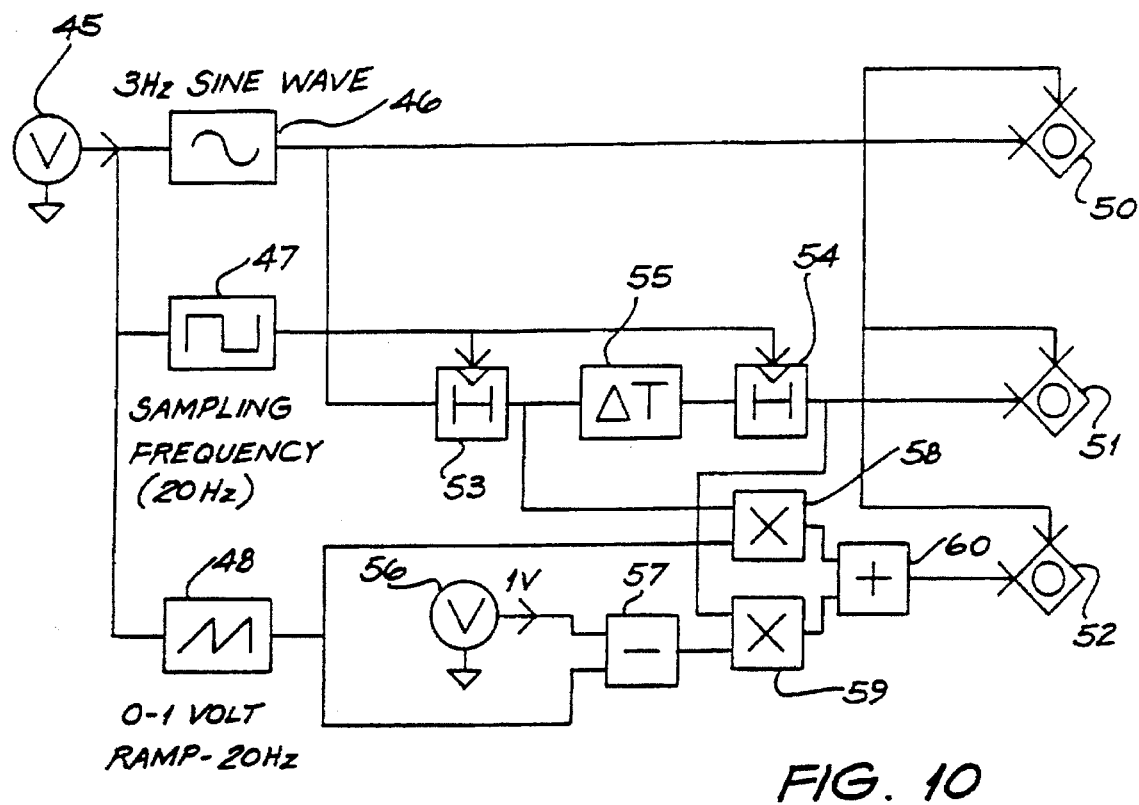
FIG. 10 is an array which forms a linear interpolation.

Turning now to FIG. 10, this drawing illustrates the array able to be first drawn and then compiled to emulate a linear interpolation circuit. A constant voltage source 45 is applied as an input to three voltage controlled oscillators 46–48 which respectively have a sine-wave output, a square-wave output and a ramp output. The output of the sine-wave is set at 3 Hz whilst the output of the other two generators 47 and 48 is set at the sampling frequency of 20 Hz. The output of the sine-wave oscillator 46 is used to trigger each of three displays 50–52. The output of the square-wave oscillator 47 is used to trigger two sample and hold circuits 53, 54 which are separated by a time delay circuit 55 having a delay which is approximately equal to the period of the sampling. This ensures that the outputs of the two sample and hold circuits 53, 54 represent the results of successive samples.

A further voltage reference 56 is set at one volt and comprises one input to a subtractor 57. The linear interpolation is carried out by the two multipliers 58, 59 and the adder 60. The multipliers multiply the ramp gradient by the correct proportion determined by the amplitude differences of successive samples held in circuits 53, 54.

Figure 11:
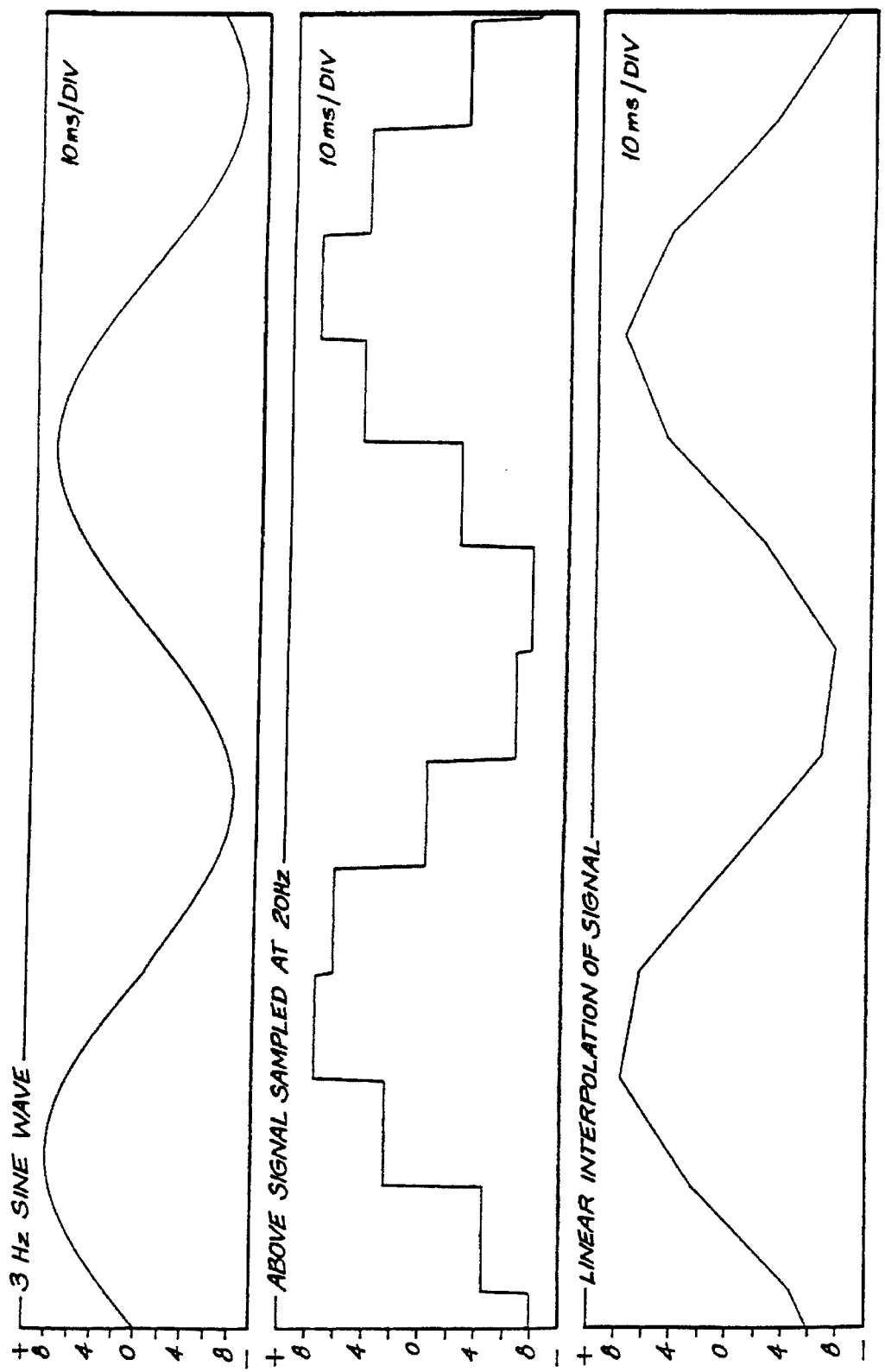
FIG. 11. shows the output of the three screen displays illustrated in FIG. 10.

The "input" sine-wave at 3 Hz which constitutes the screen display 50 is illustrated in FIG. 11 as is the sampled sine-wave which constitutes the display 51. The linear interpolation created from the sampled sine-wave constitutes the display 52 and is also illustrated in FIG. 11.

Figure 12:
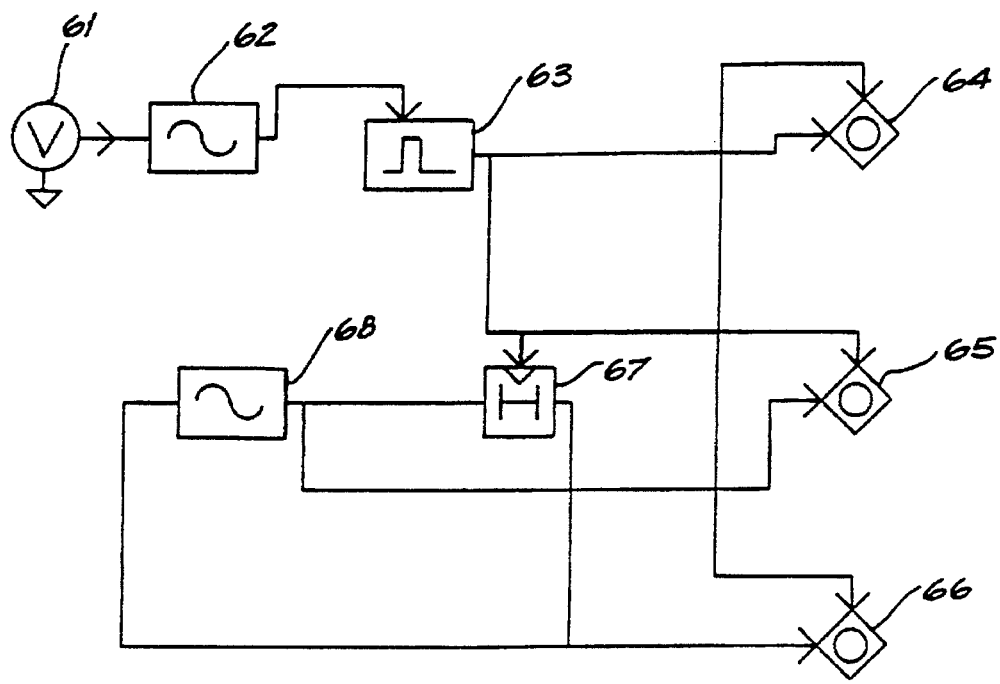
FIG. 12 is an array which forms a phase locked loop.

FIG. 12 illustrates an array which constitutes a phase locked loop. Again, a voltage reference 61 constitutes the input of a voltage controlled sine-wave oscillator 62, the reference voltage of 61 being set so as to set the frequency produced by the oscillator 62 at 51Hz. The output of the oscillators 62 is used to trigger a pulse circuit 63. The output of the pulse circuit in turn triggers three displays 64–66 and constitutes the display signal for display 64.

Figure 13:
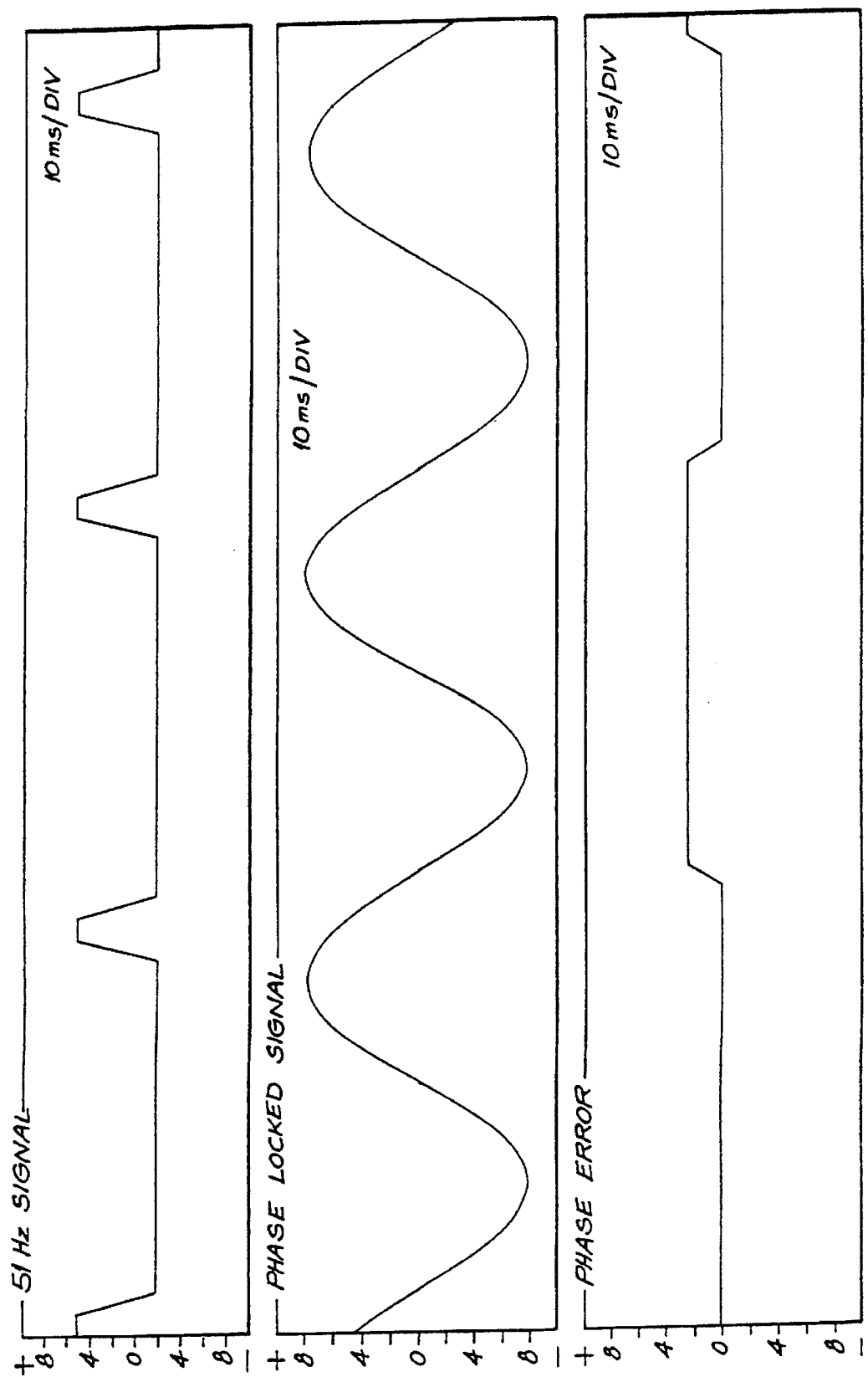
FIG. 13 shows the output of the three screen displays illustrated in FIG. 12.

In addition, the output of the pulse circuit 63 is used to trigger a sample and hold circuit 67 which has an input formed from the output of a voltage controlled sine-wave oscillator 68 which is set to have a centre frequency of 50 Hz. The input to the voltage control oscillator 68 constitutes the output of the sample and hold circuit 67 which essentially represents the phase difference between the signals from the oscillators 68 and pulse circuit 63. This error signal is displayed by display 66, the output of the voltage control oscillator 68 being displayed by display 65. The three displays 64, 65 and 66 of FIG. 12 are respectively illustrated in FIG. 13.

Figure 14:
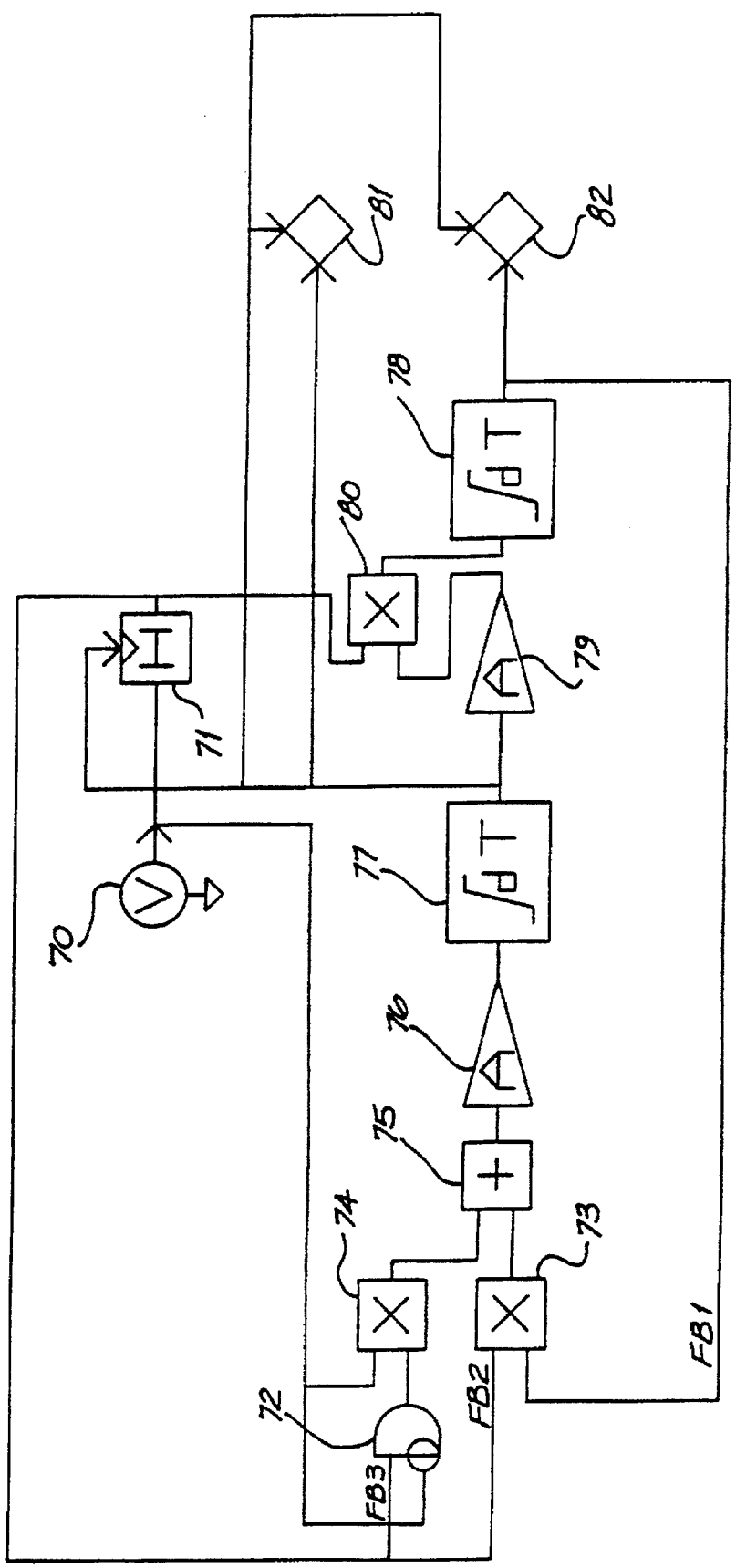
FIG. 14 is an array which provides an analogue solution to a second order differential equation.

An array to solve a second order differential equation is illustrated in FIG. 14. Here three feedback loops FB1–FB3 are provided. In order to set the initial conditions, a voltage reference 70 set to one volt is used to provide an input to a sample and hold circuit 71 and the inverting input of a comparator 72. The output of the sample and hold circuit 71 is fed back to the comparator 72 and also to one of two multipliers 73, 74. The output of the multipliers 73, 74 are added together in adder 75 and multiplied by the gain of amplifier 76 before being integrated by the first of two integrators 77, 78. A further amplifier 79 and multiplier 80 complete the circuit. The outputs of each of the integrators 77 and 78 form the waveforms displayed by two displays 81 and 82 which are both triggered by the output of the first integrator 77.

Figure 15:
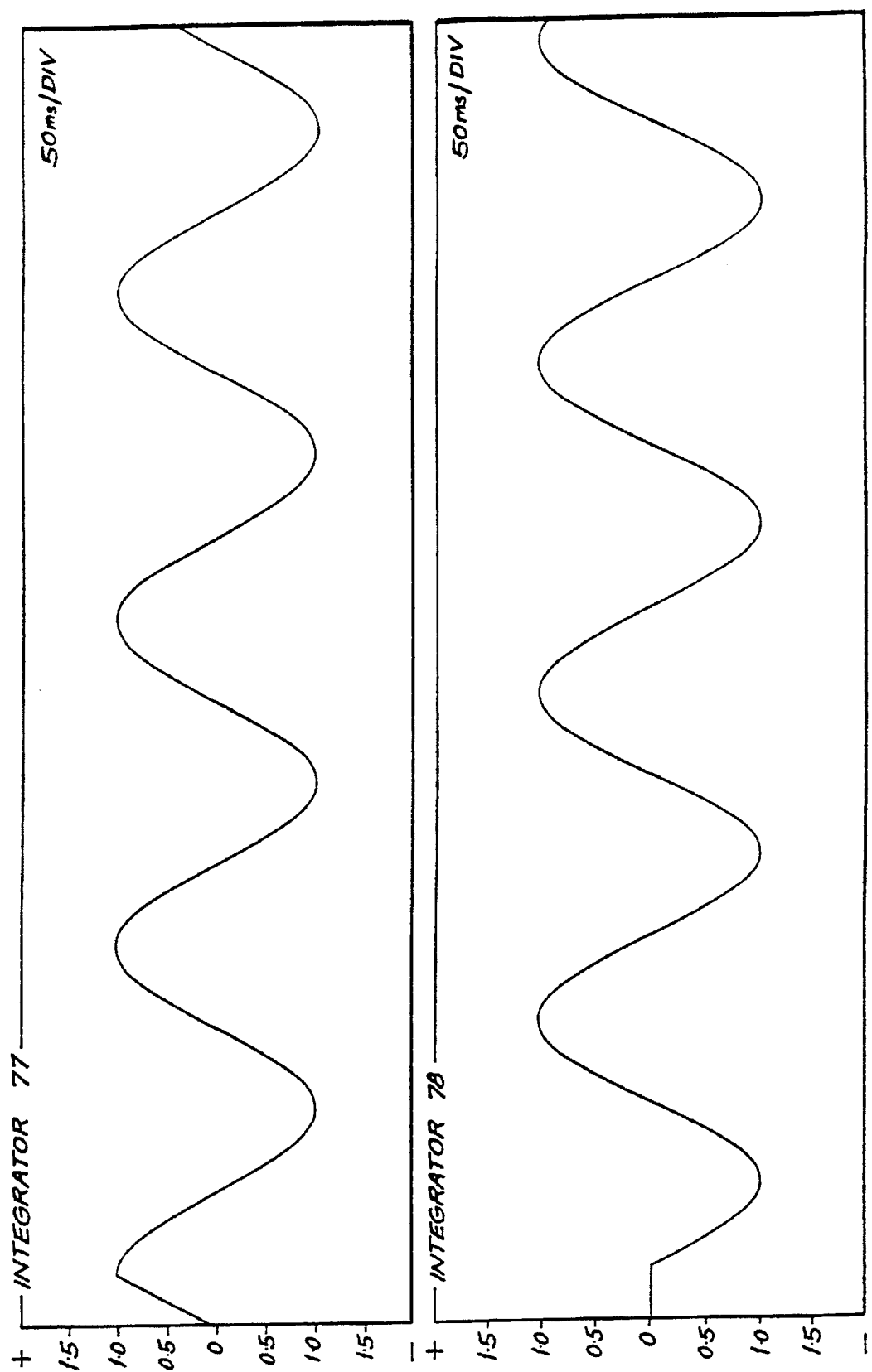
FIG. 15 shows the output of the two screen displays illustrated in FIG. 14.

The results are illustrated on FIG. 15 and show both the initial solution corresponding to the initial conditions, and that the output constituting the solution of the differential equation runs indefinitely without apparent losses or gains within the limitation of quantizing errors. In an actual electronic circuit realisation to give effect to the solution of the second order differential equation, the use of real capacitors with losses, for example, would result in the progressive decay or growth of the output signal. However, with the above described arrangement because the solution is being continually calculated, there is no apparent decay, nor any unstable growth leading to saturation. This represents a substantial improvement over the prior art analogue computers.

Figure 16:
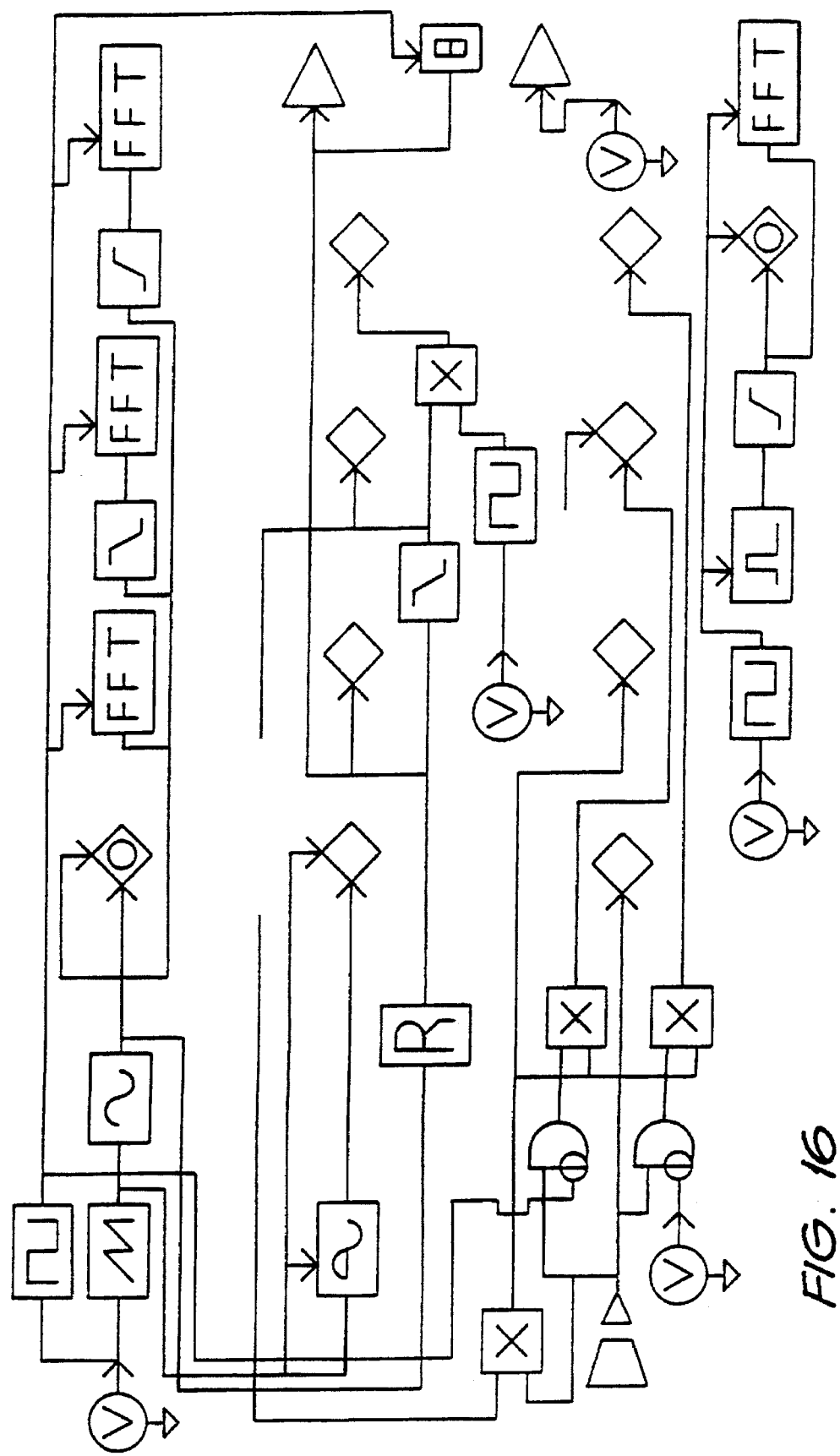
FIG. 16 is a more complex array.

FIG. 16 is an example of a more complex array able to be compiled in accordance with the preferred embodiment of the present invention. It will be seen from FIG. 16 that four Fast Fourier Transforms, six different signal generators, numeric displays, bar charts, four reference voltages, four 40 dB/decade filters, one "area under the curve" calculator and numerous comparators, multipliers, and the like are all provided.

Because the results, such as the waveforms illustrated in FIG. 6, are stored in memory, the user is able to replay these stored real time results. Furthermore, various portions of the results are able to be extracted for any specific purpose and even fed back into the apparatus using a "from disc" icon. This allows the signal processing to be adapted so that a desired feature of the input signal will be detected. Also the stored result can be continually replayed in real time, or faster or slower, as desired. Similarly, initial conditions can be established by using the previously stored result of a first array, as the initial input condition for a second array.

Furthermore, because the results are stored, the stored data is able to be edited and exported to spreadsheets, graphics or statistics utility programs such as EXCEL, LOTUS 123, and the like. This enables the graphical results of experiments to be combined with text describing the nature of the experiments and the nature of the conclusions.

The windows such as those indicated in FIG. 8, for example, are also compatible with multi media standards for the IBM PC. The specification for the window icon can be set up to be "PAL" which receives a conventional signal from a video camera, convert and then displays the video signal on the screen. If desired, this video signal can be frame grabbed to pixel video data which is able to be stored in the computer memory. If desired the conventional video camera signal can also be stored on a VCR at the same time. This stored video data can be replayed in the same manner as any other waveform captured by the apparatus. In this way, video picture correlation with other signal waveforms can be achieved. The time stamp placed on the conventional VCR video tape is, in this embodiment, synchronised with the signal data captured by the apparatus and stored therein. This arrangement is particularly advantageous since it enables the electrical results to be clearly identified with the optical record of the events which created the results.

The provision of icon specification means that the apparatus is particularly adaptive. For example, an array can be formed with a view to carrying out an analysis of, for example, the electrical voltages produced by the human heart. If as a result of the analysis of the results of these experiments, it is thought that a particular drug may produce some beneficial effect, then the array itself need not be changed in order to permit the same measurement to be carried out on a rat to which the drug has been administered. All that is required to be changed is the specification of those icons which are used, for example, as a reference. For example, the actual voltage level and the frequency can be adjusted in order to account for the different electrical outputs (e.g. voltage levels and different pulse rates) between humans and rats.

Furthermore, the ability to create arrays at will means that the apparatus is able to measure the association or independence between signals and so add a further dimension to the results able to be achieved. For example, a heart rate can be correlated with, or multiplied by, a respiration rate of a patient to give a third signal which can be regarded as a signature signal representing a result of significance to the user. Many such signals, even of mixed units, can be associated in this manner, if necessary scaled appropriately, and then compared against past data stored in memory.

It will be apparent to those skilled in the art, that the above described system has integrated all functions that are required for an analog workstation. Hitherto, there has not been a completely integrated system. Instead a plethora of partial functions existed.

In particular the following features are component parts of the integrated whole of the scientific emulator of the preferred embodiment.

1 A multiple purpose/multifunction analog module which inputs/outputs digital and analog signals and other functions.

2 A "real time" video, both in PAL or picture form at the same time and waveform displays in up to 40 windows on one screen are available. The oscilloscopic displays (one kind of display methodology) are able to display sample rates of the order of 25 KHz or better.

3 Signal processing is not controlled by a prose style (von Neuman) sequentially syntactic "line language" but by a simply understood and readily used parallel graphic compiler which is able to be used by non programmers.

4 Waveforms and graphic arrays in pictorial form are readily transported to existing PC tools such as wordprocessors, spreadsheets and "offline" analysis software for report generation/records etc.

5 Non volatile storage can be accessed in such a way as to be able to "source" data that is to be fed back into an array for other results. Also correlating a waveform template, stored on disc, against any incoming waveform to achieve shape detection is available. (Template matching).

6 Network comparability. The system is able to have list various functions distributed over a network. That is, storage can be performed at the PC in an office, or waveform data can be sourced on one PC to be displayed on another. Also the program and data can be transported over the network to another similar scientific instrument emulator for analysis. The data and program are linked and are "bundled" for network transmission.

In its preferred form, the system takes the form of a signal processing device comprising proprietary hardware and software which is contained in an IBM PC with data acquisition amplifiers positioned in floppy disk nacelles and processor PCBs and real time video cards fitted onto the PC system bus. The device in one configuration contains an extra 2 ordinary General purpose processors and a further 2 signal processors. These combined processors are programmed by the use of a graphical compiler on the VGA screen in such a way that the PC host (operating at say three million instructions per second) views the resident device subsystem (operating say at fifteen million instructions per second) as an extension of its memory. All the other processors also see each other as extensions of their own memory. In this way the multitasking software can manage multiple processors with each task on the various processors communicating with the other task(s) and/or processor(s) by passing pointers to shared memory. Thus no special communications hardware or software is required. The graphical compiler which compiles executable object code for the installed subsystem, allows the rigorous use of mathematics which is processed so fast as to simulate real time with all necessary processing performed during a single sample time.

In addition to the functional adequacy of the programming system of the graphic complier, the programming system using icons is constructed in such a way that compiled icons can themselves be composed of simple icons. This allows mathematical construction to be applied to two types of data streams involved with the processing. One of these types of data streams is the "acquired data stream" from the analogue to digital inter-conversion process and the other type is a "trigger stream". A trigger stream is some signal acquired from this inter-conversion and with which other signals which are desired to be displayed in time relationship, or is created by a timebase established in the array. Most often the trigger stream is created by a processing function wherein processing on one or many channels creates a signal which is intended to trigger displays, trigger processing such as averaging, or trigger storage. In general it is the complex trigger capability of the system, simply represented by the graphical compiler, which allows the accumulation of parameters which characterise various waveforms or epochs of waveforms. This allows their selection by experts to establish an "example set".

INDUSTRIAL APPLICATION

The cost effectiveness of the apparatus of the preferred embodiment can be considered from the following. The apparatus can function as any one of the following devices, or any combination of the following devices (or multiples thereof) arranged together into an array.

| DEVICE | COST A$ |
| --- | --- |
| 1  4 Channel Chart Recorder (500 Hz/channel) | 10,000 |
| 2  FFT analyser (1 Hz–20 KHz, max 512 points, 200 analyses sec.) | 13,000 |
| 3  Frequency Counter (0.01% accuracy, 0.01 Hz–10 MHz) | 1,000 |
| 4  Function Generator (Sine, square, ramp, and triangle waveforms, 0.01 Hz–2 MHz) | 5,000 |
| 5  Data Logger (PC based) | 4,000 |
| 6  Energy Monitor (Volts × Current, isolated inputs) | 4,000 |
| 7  2 Channel Transient Recorder | 3,500 |
| 8  Electrophysiological Monitor (ECG, EEG, EMG, ERP) | 20,000 |

The above items of equipment constitute a cost of approximately A$60,500, however, the retail price of a scientific instrument emulator in accordance with the preferred embodiment and able to emulate the above functions is in the vicinity of A$15,000 (assuming the user has an appropriate personal computer to both receive the necessary hardware and run the necessary software).

Furthermore, the large number of parallel inputs in the integrated system is well suited to the study and analysis of parallel systems such as ecosystems, biosystems, machine systems, etc.

The foregoing describes only one embodiment of the present invention and modifications, obvious to those skilled in the art, can be made thereto without departing from the scope of the present invention.

-24-

APPENDIX I

Copyright © 1991 Associative Measurements Pty Limited

Code for Sheets.

The following code is used to define a sheet in which the user specifies the parameters for a triggered pulse generator:-

```c
/****************************************************************
 *              AMLAB - Associative Measurement Laboratory
 *
 *              PULSE Icon Overlay Sheet
 *
 */
#include     <stdio.h>
#include     <stdlib.h>
#include     <string.h>
#include     <dir.h>
#include     "library.h"
#include     "pulsegen.h"

/****************************************************************
 *              Window Dimension Constants
 ****************************************************************
 */
#define      WINDOW_WIDTH       55
#define      WINDOW_HEIGHT      21
#define      USER_X_SIZE        WINDOW_WIDTH
#define      USER_Y_SIZE        (WINDOW_HEIGHT - 1)
/*
 ################################################################
 ####         PULSE Sheet Parameter Definition
 ################################################################
 */
typedef      struct
             {
             ICON_PARAM         ip;
             PULSE_ICON_PARAM   pa;
             } PULSE_SHEET;

PULSE_SHEET     pulse_vars =
    {{ICON_PARAMETER_REC,
    1, sizeof(PULSE_SHEET), {0}, sizeof(PULSE_ICON_PARAM)},
    {1000, MAX_STATE_LEVEL, MIN_STATE_LEVEL, 0,
    {POSITIVE_EDGE, 0}, 0, NORMAL_TRIGGER}
    };
```

-25-

```
/*
##################################################################
PULSE Sheet WINDOW Definition
##################################################################
*/
/*****************************************************************
*                   PULSE sheet Variables
******************************************************************
*/
/* Local string Arrays.      */
char    tilte[] = "PULSE GENERATOR SHEET";

/* ########   Sheet Title Definition ########     */
TITLE pulse_sheet_title =
                            {
                            NULL,
                            -1,
                            BLACK,WHITE,
                            tilte,
                            NULL
                            };

/* ########   Sheet Control Definition    ########    */
CONTROL    pulse_sheet_control =
                            {
                            NULL,
                            -1,
                            IWHITE,GREY,
                            LOGO,
                            0,0,
                            0,NULL,
                            0,0,0,0,
                            0,0,0,0
                            };

/*      ########      Edit Region Structure Definitions.    ########
*/
int     check_duration(int);
EDIT_DEFN pulse_duration =
        {
        UNSIGNED_INTEGER,
        5,
        BLACK,WHITE,IWHITE,GREY,
        0,0,
```

–26–

```
                "Pulse ON State Duration (Samples): ",
                &pulse_vars.pa.duration,
                check_duration,
                NULL
                };

int     check_on_level(int);
EDIT_DEFN pulse_on_level =
                {
                INTEGER,
                6,
                BLACK,WHITE,IWHITE,GREY,
                0,0,
                "Pulse State Levels (mV) - ON: ",
                &pulse_vars.pa.on_level,
                check_on_level,
                NULL
                };

int     check_off_level(int);
EDIT_DEFN pulse_off_level =
                {
                INTEGER,
                6,
                BLACK,WHITE,IWHITE,GREY,
                0,0,
                "- OFF: ",
                &pulse_vars.pa.off_level,
                check_off_level,
                NULL
                };

int     check_trigger_level(int);
EDIT_DEFN pulse_trigger_level =
                {
                INTEGER,
                6,
                BLACK,WHITE,IWHITE,GREY,
                0,0,
                "Trigger Level (mV): ",
                &pulse_vars.pa.trigger_level,
                check_trigger_level,
                NULL
                };
```

-27-

```
int     check_edge(int);
EDIT_DEFN pulse_trigger_edge =
            {
            CHAR,
            1,
            BLACK,WHITE,IWHITE,GREY,
            0,0,
            "Edge (+,-): ",
            &pulse_vars.pa.edge,
            check_edge,
            NULL
            };

int     check_slew(int);
EDIT_DEFN pulse_trigger_slew =
            {
            UNSIGNED_INTEGER,
            5,
            BLACK,WHITE,IWHITE,GREY,
            0,0,
            "Slew (mV/mS): ",
            &pulse_vars.pa.slew,
            check_slew,
            NULL
            };

int     check_mode(int);
EDIT_DEFN pulse_trigger_mode =
            {
            CHAR,
            MAX_TRIG_MODE,
            BLACK,WHITE,IWHITE,GREY,
            0,0,
            "Mode (SINGLE SWEEP, NORMAL): ",
            &pulse_vars.pa.trigger_mode,
            check_mode,
            NULL
            };

/* ######## Sheet Region Definitions.   ########   */
SCREEN_REGION   pulse_sheet_regions[] =
            {
            EDIT_CLASS,
```

-28-

```
        4,2,0,0,
        &pulse_duration,

EDIT_CLASS,
        4,5,0,0,
        &pulse_on_level,

EDIT_CLASS,
        28,7,0,0,
        pulse_off_level,

EDIT_CLASS,
        4,10,0,0,
        &pulse_trigger_level,

EDIT_CLASS,
        12,12,0,0,
        &pulse_trigger_edge,

EDIT_CLASS,
        12,14,0,0,
        &pulse_trigger_slew,

EDIT_CLASS,
        4,17,0,0,
        &pulse_trigger_mode
        };

#define   NR_REGIONS      (sizeof(pulse_sheet_regions) /
sizeof(SCREEN_REGION))

/*   ########   PULSE Sheet Window Definition.   ########
*/
AMWINDOW pulse_sheet_window[] =
        {
        0,0,0,0,
        (VIRTUAL_MAX_X / 2), (VIRTUAL_MAX_Y / 2),
        WINDOW_WIDTH, WINDOW_HEIGHT,
        0,0,
        BLACK,WHITE,
        NULL,
        NULL,
        NULL,
        &pulse_sheet_title,
```

-29-

```
            &pulse_sheet_control,
            0,NULL,
            NR_REGIONS,pulse_sheet_regions
            };

/*   ########        Error Messages.    ########   */
ERROR_MSG     pulse_sheet_errors[] = {
          /*     0     */
            RANGE_ERROR,
"Pulse Duration Error.\n\nThe Pulse \
Duration specified is Invalid.\n\nValid range is from 1 to 65535 samples", /*     1     */
            RANGE_ERROR,
            "ON State Level Error.\n\nThe ON state \
level specified for the pulse is Invalid.\n\nValid Range is -10000 to 10000
mV.", /*     2     */
            RANGE_ERROR,
            "OFF State Level Error.\n\nThe OFF state \
level specified for the pulse is Invalid.\n\nValid Range is -10000 to 10000
mV.", /*     3     */
            RANGE_ERROR,
            "Trigger Level Error.\n\nThe Trigger \
level specified is Invalid.\n\nValid Range is -10000 to 10000 mV.", /*     4     */
            RANGE_ERROR,
            "Edge Error.\n\nThe Trigger Edge \
specified is Invalid.\n\nValid Edges are + or -.", /*     5     */
            RANGE_ERROR,
            "Trigger Mode Error.\n\nThe Mode \
specified is Invalid.\n\nValid Modes are SINGLE SWEEP or NORMAL.", /*     6     */
            RANGE_ERROR,
            "Slew Rate Error.\n\nThe Slew \
rate specified is Invalid.\n\nValid Range is 0 to 10000 mV/mS."    };
```

-30-

```
/*
###################################################################
PULSE Sheet Definition
###################################################################
*/
SHEET        pulse_sheet =
             {
             pulse_sheet_window,
             &pulse_vars.ip,
             pulse_sheet_errors
             };

/* Local Save Area of Global Variable Pointer.   */
GLOBAL_VARS    *global_variables;

/*****************************************************************
*                PULSE Sheet Handler
*
******************************************************************
*/
SHEET       *pulse_sheet_handler(GLOBAL_VARS     *global)
{
       /* preset the global variables static */
       global_variables = global;

return( sheet_handler( global, USER_X_SIZE, USER_Y_SIZE,
              NR_REGIONS, &pulse_sheet, pulse_sheet_regions ) );
}

/*****************************************************************
*                Check Duration      (0)
******************************************************************
*/
int    check_duration(int    checkpoint)
{
       return( check_rangeu( checkpoint, &pulse_vars.pa.duration,
              MAX_UNSIGNED, 1, 0 ) );
} etc...
```

-31-

APPENDIX II

Copyright © 1991 Associative Measurements Pty Limited

Compiler Elements

The following code is an example of the compiler element used for a triggered pulse generator:-

```
/****************************************************************
*                    Pulsegen Icon Compiler Overlay
****************************************************************
*/
#include     <stdio.h>
#include     <stdlib.h>
#include     "compiler.h"
#include "library.h"
#include     "comms86.h"
#include     "pulsegen.h"
/****************************************************************
*                    Local Definitions
****************************************************************
*/
void    init_trigger_params(PULSE_ICON_PARAM *);

/*
##########################################
Pulse Process
##########################################
*/
#define      NR_PULSE_INPUTS          1
#define      NR_PULSE_OUTPUTS         1

/* I/O Buffer Lists.   */
unsigned    int    pulse_input_ids[NR_PULSE_INPUTS] = {1};
unsigned    int    pulse_output_ids[NR_PULSE_OUTPUTS] = {0};

/* Cell Parameters.   */
struct PULSE_struct  pulse_param;

/* Processes in this Icon.   */
struct proc_type      pulse_proc =
     {
     NULL,             /* the next process defined */
     PULSE,            /* the cell required */
     pulse_input_ids,  /* array of input buffer numbers */
     pulse_output_ids, /* array of output buffer numbers */
     &pulse_param,/* array of the initial values of the cells parameters */
```

```c
            0           /* the base xdram address of variables for this cell */
        };

/*
##################################################
Trigger Process
##################################################
*/
#define     NR_TRIGGER_INPUTS       1
#define     NR_TRIGGER_OUTPUTS      1

/* Trigger input ID specifications. */
unsigned    int     trig_input_ids[NR_TRIGGER_INPUTS] = {0};

/* Trigger output ID specifications. */
unsigned    int     trig_output_ids[NR_TRIGGER_OUTPUTS] = {1};

/*      Trigger parameters.  */
struct THRESH_struct    trig_params;

/*      Process Descriptor.  */
struct  proc_type trigger_proc =
        {
        &pulse_proc,        /* the next process defined */
        THRESH,             /* the cell id required */
        trig_input_ids,     /* array of input buffer numbers */
        trig_output_ids,    /* array of output buffer numbers */
        &trig_params,       /* array of the initial values of the cells
                                parameters */
        0                   /* the base xdram address of variables for this
                                cell */
        };

/*
##################################################
PULSEGEN CONFIGURATION
##################################################
*/
unsigned    int     *int_interconnect_ids[] =
        {
        &trig_output_ids[0],
        &pulse_input_ids[0]
        };
```

```
#define     NR_INTERCONNECT_IDS  (sizeof(int_interconnect_ids) /
                                  sizeof(unsigned int *))

unsigned    int     *ext_input_ids[] =
    {
        &trig_input_ids[0]
    };

#define     NR_EXT_INPUT_IDS     (sizeof(ext_input_ids) /
                                  sizeof(unsigned int *))

unsigned    int     *ext_output_ids[] =
    {
        &pulse_output_ids[0]
    };

#define     NR_EXT_OUTPUT_IDS    (sizeof(ext_output_ids) /
                                  sizeof(unsigned int *))

/*    PULSEGEN Dsp System Configuration.    */
ICON_CONFIG     pulse_config =
    {
        2,              /*    nr_processes    */
        &trigger_proc,  /*    process list    */
        0,              /*    nr_raw          */
        NULL,           /*    raw list        */
        0,              /*    nr_screen       */
        NULL,           /*    screen list     */
        0,              /*    nr_virtual      */
        NULL,           /*    virtual list    */
        NR_INTERCONNECT_IDS,/* number of int interconnect ID's.*/
        int_interconnect_ids,
        NR_EXT_INPUT_IDS,   /* number of external input ID's.*/
        ext_input_ids,
        NR_EXT_OUTPUT_IDS,  /* number of external output ID's.*/
        ext_output_ids,
        NULL,           /* Overlay Struct      */
        NULL,           /* Icon parameter key  */
        NULL,           /*    next_proc       */
        NULL,           /*    next_raw        */
        NULL,           /*    next_scrn       */
        NULL,           /*    next_virt       */
        NULL };         /*    next_icon       */
```

-34-

```
/***************************************************************
 *                      Request Block Size
 ***************************************************************
 */
unsigned    int    mem_block_size = 0;

/***************************************************************
 *                   Pulsegen Descriptor Handler
 ***************************************************************
 */
void    *pulsegen(GLOBAL_VARS *gv, void *mem_block, ICON_PARAM
*ip)
{
PULSE_ICON_PARAM    *pip;

/* Check for memory block request. */
if (mem_block == NULL)
        return(&mem_block_size);

/* Index pulse icon parameters.    */
pip = (PULSE_ICON_PARAM *) &ip[1];

/*      Set the pulse state levels.    */
pulse_param.WIDTPU = pip->duration;
pulse_param.HIGHPU = calc_AD_val(pip->on_level);
pulse_param.LOW_PU = calc_AD_val(pip->off_level);

/* Set the Trigger Cell Variables.    */
init_trigger_params(pip);

/* Return Configuration Pointer.    */
return(&pulse_config);
}

/***************************************************************
 *                      Init Trigger Params
 ***************************************************************
 */
void    init_trigger_params(PULSE_ICON_PARAM *pip)
{
/*      Transfer the level parameter. */
trig_params.THRETH = calc_AD_val(pip->trigger_level);

/*      Preset trigger width. */
```

-35-

```
trig_params.WINSTH = 1;

/* Transfer the Slew Parameter.    */
trig_params.SLEWTH = pip->slew;

/* Preset Dead Period.*/
trig_params.DEADTH = 0;

/* Transfer the Trigger Edge Setting.*/
if (pip->edge[0] == POSITIVE_EDGE)
      trig_params.POSTTH = FLAG_POS_EDGE;
else
      trig_params.POSTTH = FLAG_NEG_EDGE;

/* Transfer the One Shot Status.    */
if (stricmp(pip->trigger_mode, SINGLE_SWEEP_TRIGGER) == 0)
      trig_params.ONESTH = FLAG_ONE_SHOT;
else
      trig_params.ONESTH = FLAG_CONTINUOUS;
}
```

-36-

APPENDIX III

Copyright © 1991 Associative Measurements Pty Limited

Cell Code

The following code is used to implement the Pulse Generator on the DSP chip. It is written in TMS320 assembler code.

```
*
*              Cell   :-    PULSE
***************************************************************
*
*                       Synopsis
* This cell generates a pulse once every time a trigger occurs.
* It has one input which is a trigger stream.
* It has one output which is the pulse train produced.
*
* The cell has the following functioning :-
*
*      read in the trigger buffer
*
*      for each point in the buffer:-
*
*              if waiting for the trigger to go high:-
*
*                      if trigger is high:-
*
*                              change state to 1.
*                              reset pulse width counter.
*
*              else if trigger is low
*
*                      change to state 0
*
*              if( count > 0 )
*
*                      count--;
*                      output = high
*
*              else output = low.
*
*      finish the cell
*
***************************************************************
*
        IDT    'PULSE'
        COPY WHERELIB
```

-37-

```
*
******************************************************************
*
*       SYSTEM VARIABLES
*
******************************************************************
*
        REF   RG1           WORKING REGISTERS
        REF   RG2
        REF   RG3
        REF   ONE           THE NUMBER ONE
        REF   BUFSIZ        THE SIZE OF BUFFERS
        REF   I             A COMMONLY USED LOOP COUNTER
        REF   FREE$H        THE ALLOC_BASE_PTR
        REF   ZERO          ZERO
*
******************************************************************
*               SYSTEM CALLS
******************************************************************
*
        REF   ENDCEL        THE END OF THIS CELL
*
******************************************************************
*
*               LIBRARY ROUTINES
*
******************************************************************
*
        REF   READCH        READ IN A CHANNEL
*
******************************************************************
*
*               THIS CELLS VARIABLES
*
******************************************************************
*
        REF   TRIGPU        INPUT. THE CELLS TRIGGER
*                           INPUT.
        REF   OUT$PU        OUTPUT. THE CELLS OUTPUT.
        REF   BUFFPU        TEMP ARRAY. USED TO BUFFER
*                           POINTS.
        REF   STATPU        STATIC. STATE OF TRIGGER
*                           DETECTION.
        REF   WIDTPU        PARAM. WIDTH OF PULSE.
```

-38-

```
        REF   HIGHPU         PARAM. HIGH PULSE LEVEL.
        REF   LOW$PU         PARAM. LOW PULSE LEVEL.
        REF   COUNPU         STATIC. THE NUMBER OF POINTS
*                            LEFT IN THE PULSE
*
****************************************************************
*
*       CONSTANTS
*
****************************************************************
*
        COPY CASPDEF
*
****************************************************************
*
*       PULSE.
*           INPUTS
*                  TRIGPU
*
*           OUTPUTS
*                  OUT$PU
*
****************************************************************
*
        DEF   PULSE
*
PULSE
*
*       read in the trigger buffer
*
        LARK AR1,BUFFPU
        LAC  TRIGPU
        SACL RG1
        CALL READCH
*
*       for each point in the buffer:-
* for( i = 0 ; i < buf_size ; i++ )
*
        LAR  AR0,BUFSIZ
        LARK AR1,BUFFPU
        LAC  OUT$PU
        ADD  ONE,1             LINE UP WITH DATA
        SACL RG1
        SXRAM     RG1
```

```
*
PULSF1    BANZ PULSC1
*
          B     ENDCEL
PULSC1
*
*               if trigger is high:-
*
*
* READ IN THE TRIGGER
*
          LARP  AR1
          LAC   *+,0,AR0
          BZ    ELSE1
*
*                         if waiting for the trigger to go high:-
*
          LAC   STATPU
          BNZ   DOOUT
*
*                                   change state to 1.
*                                   reset pulse width counter.
*
          LAC   ONE
          SACL  STATPU
          LAC   WIDTPU
          SACL  COUNPU
          B     DOOUT
*
*               else change to state 0
*
ELSE1     ZAC
          SACL  STATPU
*
*               if( count > 0 )
*
DOOUT     LAC   COUNPU
          BLEZ  ELSE2
*
*                         count--;
*                         output = high
*
          SUB   ONE
          SACL  COUNPU
```

−39−

-40-

```
        WXDRAM  HIGHPU
        B       PULSF1
*
*           else output = low.
*
        NOP
ELSE2 WXDRAM  LOW$PU
        B       PULSF1
*
*       finish the cell
*
        END
```

-41-

APPENDIX IV

Copyright © 1991 Associative Measurements Pty Limited

DSP System Code

The following code implements the system used by the DSP's in an AMLAB environment:-

```
*
*       MODULE:-   SYSTEM
*
*******************************************************************
*
*                       SYNOPSIS
*
*  DUE TO THE PERFORMANCE REQUIREMENTS OF THE TMS320 IT
* IS NECESSARY TO IMPLEMENT EACH PROCESSING ELEMENT AS
* A CELL IN A INTERPRETER TYPE SITUATION. AN EXPLAINATION
* OF THIS INTERPRETER FOLLOWS. NO ATTEMPT TO EXPLAIN
* WHY THINGS ARE DONE THE WAY THEY ARE IS GIVEN HERE AS
* THESE CAN BE FOUND IN THE ACCOMPANYING
* SPECIFICATIONS.
*
* DEFINITION OF TERMS
*
* CELL          A PROCESSING ELEMENT. THE TOTAL
*               PROCESSING TO BE DONE IS
*               BROKEN DOWN INTO MODULES THAT ARE
*               EASY TO IMPLEMENT.
*
* EVENT         AN EVENT IS SOMETHING THAT HAPPENS. IT
*               MAYBE INTERNAL TO THE SYSTEM SUCH AS A
*               BEAT IS PROCESSED TO A CERTAIN LEVEL OR
*               EXTERNAL SUCH AS AN INTERRUPT. THIS
*               EXECUTIVE IS AN EVENT DRIVEN ONE, IN
*               THAT IT IS EVENTS WHICH ULTIMATELY
*               DETERMINE WHICH SEQUENCES ARE RUN AND
*               IN WHAT ORDER.
*
* SEQUENCE      A PRE-DETERMINED ORDER IN WHICH CELLS
*               ARE RUN.
*
* ACTIVE        THE ACTIVE CELL IS THE CELL CURRENTLY
*               BEING EXECUTED OR ABOUT TO BE
*               EXECUTED
*
* CCB        A CELL CONTROL BLOCK. THIS CONTAINS ALL THE
```

```
*               RELEVANT INFORMATION ABOUT A CELL NEEDED
*               BY THE SYSTEM.
*
* END$CEL   THE ROUTINE WHICH TIDIES UP AFTER A CELL
*               RELINQUISHES CONTROL, FINDS THE NEXT CELL IN
*               THE SEQUENCE, AND INSTALLS THAT CELL.
*
* DESCRIPTION OF THE SYSTEM
*
*  THE SYSTEM COULD IN BROAD TERMS BE DESCRIBED AS AN
* INTERPRETER. CELL 0 IS THE HIGHEST LEVEL OF PROCESSING
* IN THE SYSTEM. IT DETERMINES WHICH SEQUENCES
* WILL BE RUN BASED ON THE INFORMATION CONTAINED IN THE
* STATUS. SEQUENCES IN TURN ARE COMPOSED OF CELLS. CELL
* 0 RUNS A SEQUENCE. THE SYSTEM TAKES THAT SEQUENCE
* AND RUNS EACH CELL IN TURN. INDIVIDUAL CELLS CAN
* CHANGE THE STATUS TO INDICATE TO CELL 0 WHAT IS THE
* RESULTS OF ITS PROCESSING. FURTHER MORE CELLS ARE ABLE
* TO ABORT THE CURRENT SEQUENCE WHICH RETURNS
* CONTROL TO THE CELL 0. CELL 0 IS DIFFERENT TO THE OTHER
* CELLS IN THAT IT ALWAYS SAVES A RETURN ADDRESS BEFORE
* RELINQUISHING CONTROL. THIS IS BECAUSE CELL 0 IS NEVER
* COMPLETED, RELINQUISHING CONTROL FREQUENTLY, AND
* RESTARTING WHERE IT LEFT OFF THIS ALLOWS US TO
* IMPLEMENT A MACRO LEVEL PROGRAM IN CELL 0, COMPOSED
* OF SEQUENCES WHICH IN TURN ARE COMPOSED OF CELLS.
*
*  SEQUENCES ARE REFERENCED BY THE SEQUENCE REFERENCE
* LIST , WHICH, FOR EASE OF PROGRAMMING EXISTS AT THE
* BOTTOM OF EXTERNAL DATA RAM. EACH MEMBER IN
* THIS LIST POINTS TO A SEQUENCE LIST. EACH SEQUENCE LIST
* MEMBER IS A POINTER TO CELL CONTROL BLOCK. EVERY
* SEQUENCE HAS A SEQUENCE LIST. EACH CONSECUTIVE
* CELL IN A SEQUENCE IS POINTED TO BY A CONSECUTIVE
* MEMBER IN THE SEQUENCE LIST
*
*  A CELL IS RESTORED BY LOADING INTERNAL DATA MEMORY
* WITH THE CELLS STATIC VARIABLES. THESE ARE POINTED TO
* BY A MEMBER OF THE CCB. THE CELLS START ADDRESS IS
* ACCESSED BY USING THE CELL ID, ANOTHER MEMBER OF THE
* CCB, AS AN OFFSET TO A LOOK UP TABLE STORED IN PROGRAM
* MEMORY CALLED THE C$A$B. A CELL IS SAVED BY THE
* REVERSE PROCESS. THE FINAL ELEMENT OF A CCB IS A
* CONSTANT. A CONSTANT IS A STATIC VARIABLE THAT DOES
```

-43-

```
* NOT CHANGE ITS VALUE AND HENCE DOES NOT NEED TO BE
* STORED AWAY.
*
******************************************************************
*
      IDT  'SYSTEM'
      COPY WHERELIB
*
******************************************************************
*
*         STATIC VARIABLES USED BY THE SYSTEM
*
******************************************************************
*
      REF  CCB$PT     A POINTER TO THE CURRENTLY ACTIVE
*                     CCB
      REF  CUR$SQ     A POINTER TO THE CURRENTLY ACTIVE
*                     SEQUENCE
      REF  ONE
      REF  TABLE      A POINTER TO THE VARIABLES TABLE
*                     IN IORAM
      REF  RG1,RG2
      REF  C$A$B      THE CELL ADDRESS BLOCK
*
      DEF  ABORT      LET OUTSIDE TASKS KNOW ABOUT THE
*                     ROUTINES
      DEF  ABORT1
      DEF  ENDCEL
      DEF  RUN
*
******************************************************************
*
*         CONSTANTS USED BY THE SYSTEM
*
******************************************************************
*
      REF  CELVAR     THE START OF A CELLS VARIABLES IN
*                     INTERNAL RAM
      REF  C0CCB      THE ADDRESS OF CELL0 CCB.
*
******************************************************************
*
*    THE SYSTEM ENTRY POINT. THIS IS ONLY USED ON START
* UP.
```

-44-

```
*
*****************************************************************
*
        DEF   SYSTEM
        PSEG
SYSTEM  B     ABORT1      SYSTEM ENTRY POINT
*
*****************************************************************
*
*       SAVE THE ENVIROMENT OF THE CURRENT CELL
*
*****************************************************************
*
SAVE  RXDRAM    RG2,CCB$PT       READ IN THE CELL ID
      RXDRAM    TABLE            READ IN THE CURRENT
*                                CELLS VARIABLE TABLE.
      RXDRAM    RG1              READ IN THE NUMBER OF
*                                INSTALLED VARIABLES
      RXDRAM    RG1              READ IN THE NUMBER OF
*                                STORED VARIABLES
*
      LAR   AR0,RG1
*
      LAR   AR1,CELVAR           SET UP THE POINTER TO
*                                THE VARIABLES
*
      SXRAM     TABLE
      LARP 0                     ARP = 0
      BANZ SAVELP                IF THERE ARE ANY MORE
*                                VARIABLES SAVE THEM
      B     SAVRET
*
SAVELP
      LARP 1
      WXDRAM    *+,,AR0          WRITE OUT THE NEXT
*                                VARIABLE
      BANZ SAVELP                ARE THERE ANY MORE
*
SAVRET
      RET
*
*****************************************************************
*
*       RESTORE THE ENVIROMENT OF THE CURRENT CELL
```

```
*
*****************************************************************
*
RESTOR
        RXDRAM    RG2,CCB$PT       READ IN THE CELL ID
        RXDRAM    TABLE            READ IN THE CURRENT
*                                  CELLS VARIABLE TABLE
*                                  ADDR.
        RXDRAM    RG1              READ IN THE NUMBER OF
*                                  VARIABLES
*
        LAR   AR0,RG1
*
        LAR   AR1,CELVAR           SET UP THE POINTER TO
*                                  THE VARIABLES
        SXRAM     TABLE
        LARP 0                     ARP = 0
        BANZ RESTLP                IF THERE ARE ANY MORE
*                                  VARIABLES SAVE THEM
        B     RESRET
*
RESTLP
        LARP 1
        RXDRAM    *+,,AR0          WRITE OUT THE NEXT
*                                  VARIABLE
        BANZ RESTLP                ARE THERE ANY MORE?
*
RESRET
        LACKB     C$A$B            FIND THE RETURN
*                                  ADDRESS FROM THE C$A$B
        ADD       RG2              THE CELLS ID
        TBLR      RG1              READ IN THE RETURN
*                                  ADDRESS
        LAC       RG1
        PUSH                       PUSH IT ONTO THE STACK
        RET                        AND GO THERE
*
```

```
***************************************************************
*
* ABORT THE CURRENTLY ACTIVE SEQUENCE AND RETURN TO
* CELL 0 THIS ROUTINE SHOULD BE BRANCHED TO.
*
***************************************************************
*
ABORT
      CALL SAVE            SAVE THE ENVIROMENT OF THE
*                          CURRENTLY ACTIVE CELL.
ABORT1
      LACKB    C0CCB       SET THE CCB POINTER TO CELL0
*                          CCB
      SACL CCB$PT
*
      B    RESTOR          AND RESTORE CELL 0
*
***************************************************************
*
*     END THIS CELL AND INSTALL THE NEXT ONE IN THE
* SEQUENCE THIS ROUTINE SHOULD BE BRANCHED TO.
*
***************************************************************
*
ENDCEL
      CALL SAVE            SAVE THE ENVIROMENT OF THE
*                          LAST CELL
* FIND THE ADDRESS OF THE NEXT CELL IN THE SEQ.
*
      RXDRAM   CCB$PT,CUR$SQ
*
      LAC  CUR$SQ          INCREMENT THE SEQ POINTER
      ADD  ONE
      SACL CUR$SQ
*
      B    RESTOR          INSTALL THE NEXT CELL
*
```

```
*****************************************************************
*
*      THIS ROUTINE IS ONLY EVER CALLED BY CELL 0. IT
* STARTS OFF A NEW SEQUENCE.
*
*****************************************************************
*
RUN    RXDRAM     CUR$SQ,RG1   RG1 CONTAINS THE SEQUENCE
*                              NUMBER WHICH IS A
*                              DIRECT OFFSET TO THE
*                              SEQUENCE POINTER.
       POP                     GET THE RETURN ADDRESS
       SACL RG2
       LACKB      C$A$B        AND WRITE IT OUT TO THE FIRST
*                              LOCATION IN THE
       TBLW RG2                C$A$B
*
       B          ENDCEL       AND PERFORM ENDCEL WHICH
*                              WILL SAVE THE ENVIROMENT OF
* CELL 0 AND THEN INSTALL THE FIRST CELL IN THE SEQUENCE
*
*****************************************************************
*
       PEND
*
```

We claim:

1. A scientific instrument emulator comprising:
   a computer including a memory coupled to a processor;
   a multifunctional input/output signal module having at least one analogue signal input with digitizing means connected thereto and at least one signal output and being configurable with respect to at least a sampling frequency of said analogue signal input;
   a video display coupled to a video display generator, said video display generator being coupled to said processor;
   a library program stored in said memory, said library program including a plurality of instrumentation units each being able to be displayed on said video display and each having a predetermined signal processing function;
   a set-up program stored in said memory and carried out by said processor to allow an operator to interconnect selected instrumentation units to form an array of interconnected instrumentation units, wherein a sampling frequency for said multifunctional input/output signal module is specified, said set-up program enables contiguous signal feedback interconnection in said array, said array having an output being provided to at least one of the following; said video display, said multifunctional input/output signal module and said memory; and
   a graphic compiler program stored in said memory and executable by said processor on completion of said set-up program to create a scientific instrument emulation program to carry out an overall signal processing function of said array of selected interconnected instrumentation units, said graphic compiler program being capable of resolving contiguous signal feedback in said array and to form an ordered list in said emulation program of said predetermined signal processing functions of said instrument units, which are each to be carried out once between successive samples of an input signal obtained using said multifunctional input/output signal module, said emulation program containing operations for configuring said sampling frequency of said multifunctional input/output signal module for sampling said input signal to provide a contiguous data stream;
   an instrument emulation sub-assembly coupled to said processor, said memory, and said video display generator, wherein said instrument emulation sub-assembly is directly connected to said multifunctional input/output signal module, said instrument emulation sub-assembly having:
     a second processor for executing said scientific instrument emulation program to continuously carry out said overall signal processing function so that each sample of said contiguous data stream is processed during a single sample time to produce an array output of said scientific instrument emulator before a successive sample of said input signal is obtained by said multifunctional input/output signal module;
     wherein at least one of a plurality of operations is performed, said plurality of operations including each of displaying said array output on said video display in real time, storing said array output in the memory, and providing said array output to said signal output of said multifunctional input/output signal module in real time.

2. The scientific instrument emulator as claimed in claim 1, wherein said instrumentation units are each represented by a corresponding icon which is able to be displayed on said video display during operation of said set-up program whereby each desired instrumentation unit can be selected, located in, and interconnected with other instrumentation units in said array.

3. The scientific instrument emulator as claimed in claim 2, wherein said array includes a data signal feedback loop connected between an output of one of said instrumentation units and an input of one said instrumentation units.

4. The scientific instrument emulator as claimed in claim 1, wherein said multifunctional input/output signal module includes an additional signal output for connection to external hardware and that is available as a real time electric signal able to operate, or trigger, said external hardware.

5. The scientific instrument emulator as claimed in claim 4, wherein said multifunctional input/output signal module has both analogue and digital signal outputs.

6. The scientific instrument emulator as claimed in claim 4, wherein said array output stored in said memory is available for subsequent graphical manipulation and/or tabulation by said computer.

7. The scientific instrument emulator according to claim 1, wherein said instrument emulation processor assembly further comprises a video generator connected to said second processor for providing a displayable representation of said array output before a succeeding sample is obtained.

8. A method for determining execution order of predefined signal processing elements in a computer having a central processing unit and electronic memory to implement in real time a mathematical/signal processing function of an emulated instrument having at least one repetitively sampled signal input to form a signal output thereof, said method comprising the steps of:
   applying a set-up program stored in said memory and carried out be said central processing unit to allow an operator to interconnect selected instrumentation units to form an array of interconnected instrumentation units, wherein a sampling frequency for a multifunctional input/output signal module is specified, said set-up program enables contiguous signal feedback interconnection in said array, said array having an output being provided to at least one of the following: a video display, said multifunctional input/output signal module and said memory, each of said instrumentation units having a mathematical/signal processing function;
   creating a scientific instrument emulation program using a graphic compiler program stored in said memory and executable by said central processing unit on completion of said set-up program, said scientific instrument emulation program carrying out said overall signal processing function of said array of selected interconnected instrumentation units;
   determining an execution order of said mathematical/signal processing function including the steps of:
     representing said function as a sequence of elemental mathematical steps in turn representable using predefined signal processing elements, and
     arranging the predefined signal processing elements in said sequence for sequential execution within the time between successive samples and commencing with said at least one sampled signal input,
   wherein said determining step thereby forms an array of instrumentation units having said overall circuit mathematical/signal processing function;
   continuously carrying out said overall signal processing function so that each sample of said contiguous data stream is processed during a single sample time to produce an array output of said overall mathematical signal processing function before a successive sample of said input signal is obtained by said multifunctional input/output signal module;

representing said overall circuit mathematical/signal processing function as a sequence of events representable as predefined signal processing element events;

arranging said predefined signal processing element events in said sequence for sequential execution commencing with said at least one sampled array signal input, whereby a determinate computation time of the predefined signal precessing elements is ensured by executing every one of said predefined signal processing elements once between successive samples, whereby said method is capable of resolving data signal feedback in said array of instrumentation units;

displaying said array output on said video display in real time;

storing said array output in the memory; and providing said array output to said signal output of said multifunctional input/output signal module in real time.

9. The method as claimed in claim 8, wherein a parameter of said functional block is able to be specified without interrupting execution of the predefined signal processing elements.

10. The method as claimed in claim 8, wherein said array includes at least one data signal feedback loop in which an output of one of said instrumentation units is connected to form an input of one of said plurality of instrumentation units, and an initial result of corresponding one of said executable events in said sequence of executable events is utilized in a repeated execution of an earlier event to generate a modified result of said corresponding one of said executable events from a previous sample period.

11. A scientific instrument for precessing electrical waveforms, said instrument comprising:

a computer having a central processing unit and electronic memory positioned within a housing for said computer, said housing including at least one floppy disc nacelle;

a video display coupled to said central processing unit;

an analogue signal processing module mounted in said floppy disc nacelle to enable access to an analogue input connector to an analogue output connector of said analogue signal processing module from the front of said computer;

an analogue-to-digital converter connected to said analogue input connector and to said central processing unit for converting an analogue input signal from said analogue input connector to a digital input signal for processing by said central processing unit, and a digital-to-analogue converter connected to said central processing unit and to said analogue output connector for converting a digital output signal from said central processing unit to an analogue output signal applied to said analogue output connector;

a library program stored in said memory, said library program including a plurality of instrumentation units each being able to be displayed on said video display and each having a predetermined signal processing function;

a set-up program stored in said memory and carried out be said central processing unit to allow an operator to interconnect selected instrumentation units to form an array of interconnected instrumentation units, wherein a sampling frequency for said converter is specified, said set-up program enables contiguous signal feedback interconnection in said array, said array having an output being provided to at least one of the following: said video display, said converter and said memory;

a graphic compiler program stored in said memory and executable by said central processing unit on completion of said set-up program to create a scientific instrument emulation program to carry out an overall signal processing function of said array of selected interconnected instrumentation units, said graphic compiler program being capable of resolving contiguous signal feedback in said array and to form an ordered list in said emulation program of said predetermined signal processing functions of said instrument units, which are each to be carried out once between successive samples of an input signal obtained using said converter, said emulation program containing operations for configuring said sampling frequency of said converter for sampling said input signal to provide a contiguous data stream; and an instrument emulation sub-assembly coupled to said central processing unit, said memory, and said video display generator, wherein said instrument emulation sub-assembly is directly connected to said converter, said instrument emulation sub-assembly having;

a second processing unit for executing said scientific instrument emulation program to continuously carry out said overall signal processing function so that each sample of said contiguous data stream is processed during a single sample time to produce an array output of said scientific instrument before a successive sample of said input signal is obtained by said converter;

wherein at least one of a plurality of operations is performed, said plurality of operations including each of displaying said array output on said video display in real time, storing said array output in the memory, and providing said array output to a digital to analog converter in real time.

12. The scientific instrument as claimed in claim 11, wherein said analogue-to digital converter includes sampling means for sampling said analogue input signal at a predetermined sampling rate.

13. The scientific instrument as claimed in claim 12, wherein said computer further includes at least one additional processing unit in addition to said central processing unit and additional memory in addition to said electronic memory, wherein all said additional processing units share said electronic memory and said additional memory.

14. The scientific instrument as claimed in claim 13, wherein said sampling means is connected to said additional processing unit and controlled thereby to select said rate.

15. The scientific instrument as claimed in claim 11, further comprising a video processing circuit connected to said analogue-to-digital converter for receiving said digital input signal and connected to a video display unit of said computer for display of a video image corresponding to said digital input signal.

16. The scientific instrument as claimed in claim 11, wherein said computer is a personal computer.

17. The scientific instrument as claimed in claim 11, wherein said analogue signal processing module further includes a frequency/count input connector and said instrument includes a counter connected to said frequency/count input connector and to said central processing unit for calculating a frequency or count from the input applied to said frequency/count input connector.

* * * * *